United States Patent
O'Young et al.

(10) Patent No.: US 10,148,216 B2
(45) Date of Patent: Dec. 4, 2018

(54) PACKAGE OF A SUPPORTING DEVICE FOR PHOTOVOLTAIC PANELS AND KIT FOR FORMING A SUPPORTING DEVICE FOR AT LEAST ONE PHOTOVOLTAIC PANEL

(71) Applicant: DARFON ELECTRONICS CORP., Taoyuan (TW)

(72) Inventors: Frank O'Young, Taoyuan (TW); Yen-Jen Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 264 days.

(21) Appl. No.: 14/736,286

(22) Filed: Jun. 11, 2015

(65) Prior Publication Data

US 2016/0365824 A1 Dec. 15, 2016

(51) Int. Cl.
| | | |
|---|---|---|
| *H02S 20/00* | (2014.01) | |
| *H02S 20/23* | (2014.01) | |
| *H02S 40/32* | (2014.01) | |

(52) U.S. Cl.
CPC .............. *H02S 20/23* (2014.12); *H02S 20/00* (2013.01); *H02S 40/32* (2014.12); *Y02B 10/12* (2013.01); *Y02B 10/14* (2013.01); *Y02E 10/50* (2013.01)

(58) Field of Classification Search
None
See application file for complete search history.

(56) References Cited

U.S. PATENT DOCUMENTS

| | | |
|---|---|---|
| 8,250,829 B2 | 8/2012 | McPheeters |
| 2008/0283118 A1 | 11/2008 | Rotzoll |
| 2012/0234377 A1 | 9/2012 | Erickson |
| 2014/0033511 A1 | 2/2014 | Swahn |
| 2014/0202525 A1 | 7/2014 | Janssens |

FOREIGN PATENT DOCUMENTS

| | | |
|---|---|---|
| CN | 201966225 U | 9/2011 |
| CN | 202072064 U | 12/2011 |
| CN | 103979217 A | 8/2014 |
| TW | 201315657 A1 | 4/2013 |
| WO | 2012109822 A1 | 8/2012 |

*Primary Examiner* — Shannon M Gardner
(74) *Attorney, Agent, or Firm* — Winston Hsu

(57) ABSTRACT

A package of a supporting device for photovoltaic panels includes a container and components, for forming the supporting device, packed in the container. The components include at least two frame supports, of which at least one is provided with an inverter attached thereon in advance. Thereby, a user can quickly assemble the supporting device. Furthermore, the inverter is substantially positioned in the container, which is conducive to stabilization in the weight distribution of the components in the container and facilitates the transport of the package. In addition, a kit for forming a supporting device for at least one photovoltaic panel includes components for forming the supporting device. The kit can be provided without a container for accommodating the components. Similarly, the components include at least two frame supports, of which at least one is provided with an inverter attached thereon in advance, which facilitates the assembly of the supporting device.

30 Claims, 19 Drawing Sheets

PACKAGE OF A SUPPORTING DEVICE FOR PHOTOVOLTAIC PANELS AND KIT FOR FORMING A SUPPORTING DEVICE FOR AT LEAST ONE PHOTOVOLTAIC PANEL

BACKGROUND OF THE INVENTION

1. Field of the Invention

The invention relates to a supporting device for photovoltaic panels, and especially relates to a package of a supporting device for photovoltaic panels.

2. Description of the Prior Art

Photovoltaic panels are widely used for clean energy. In practice, the photovoltaic panels are set on the top floor or roof of a building through a supporting device. The supporting device is provided in separate parts, including structural components and electrical components, before assembled to be set on the top floor or roof. A user needs to assemble them piece by piece, which takes a lot of time. However, the designated installation site for installing the photovoltaic panels normally is the tilted roof of a high building. The longer time a worker stays at the tilted roof for assembling and installing the photovoltaic panels, the worker suffers more risk to fall from the roof to the ground. Furthermore, the separate parts are usually just put into a box without a specific arrangement or bound in a bundle. Such packing may induce inconvenience to transport, for example due to an unfixed weight distribution of the box or an irregular shape of the bundle.

SUMMARY OF THE INVENTION

An objective of the invention is to provide a package of a supporting device for photovoltaic panels. Some components in the package have been connected in advance so that a user can quickly assemble the supporting device, and which is also conducive to an arrangement of weight of the components.

A package of a supporting device for photovoltaic panels according to invention includes a container, a first frame support, a second frame support, at least two positioning structures, at least one first power inverter, and at least one second power inverter. The first frame support and the second frame support are used for supporting the photovoltaic panels thereon and are oppositely disposed in the container. An accommodating space in the container is formed between the first frame support and the second frame support. The at least two positioning structures are fixedly disposed in the accommodating space. The at least one first power inverter and the at least one second power inverter are used for correspondingly electrically connected to the photovoltaic panels and receiving electricity from the corresponding photovoltaic panels and are attached to the first frame support and the second frame support respectively. Each of the at least one first power inverter and the at least one second power inverter is structurally constrained by one of the positioning structures between the first frame support and the second frame support. Thereby, some of the components packed in the container have been connected in advance, so that a user can quickly assemble the supporting device. Furthermore, some components in the package are substantially positioned in the container, which is conducive to stabilization in the weight distribution of the components in the container and facilitates the transport of the package.

Another package of a supporting device for photovoltaic panels according to invention includes a container, a first frame support, a second frame support, at least two spacers, at least one first power inverter, and at least one second power inverter. The first frame support and the second frame support are used for supporting the photovoltaic panels thereon and are oppositely disposed in the container. An accommodating space in the container is formed between the first frame support and the second frame support. The at least two spacers are oppositely disposed in the container. Each spacer has a first side, a second side opposite to the first side, a first indentation at the first side, and a second indentation opposite to the first indentation at the second side. The first frame support is located in the first indentations of the at least two spacers. The second frame support is located in the second indentations of the at least two spacers. The at least one first power inverter and the at least one second power inverter are used for correspondingly electrically connected to the photovoltaic panels and receiving electricity from the corresponding photovoltaic panels and are disposed in the accommodating space and attached to the first frame support and the second frame support respectively between two of the at least two spacers. Thereby, some of the components packed in the container have been connected in advance, so that a user can quickly assemble the supporting device. Furthermore, some components in the package are substantially positioned in the container, which is conducive to stabilization in the weight distribution of the components in the container and facilitates the transport of the package.

Another objective of the invention is to provide a kit for forming a supporting device for at least one photovoltaic panel. Some components of the kit have been connected in advance so that a user can quickly assemble the supporting device.

A kit for forming a supporting device for at least one photovoltaic panel according to the invention includes a first frame support, a third frame support, and at least one first power inverter. The first frame support is used for being disposed for supporting the at least one photovoltaic panel thereon. The third frame support are used for being disposed corresponding to the first frame support for supporting the at least one photovoltaic panel thereon. The at least one first power inverter is firmly attached to a first position on the first frame support before the kit is placed at a designated installation site. The at least one first power inverter is used for correspondingly electrically connected to the at least one photovoltaic panel and receiving electricity from the corresponding photovoltaic panel. Therein, the first frame support has a first end and a second end opposite to the first end. A first interval between the first end and the first power inverter closest to the first end is shorter than a second interval between the second end and the first power inverter closest to the second end. When the first frame support is under assembly for being attached to the photovoltaic panel at the designated installation site, the first power inverter maintains at the first position. Thereby, some of the components of the kit have been connected in advance, so that a user can quickly assemble the supporting device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
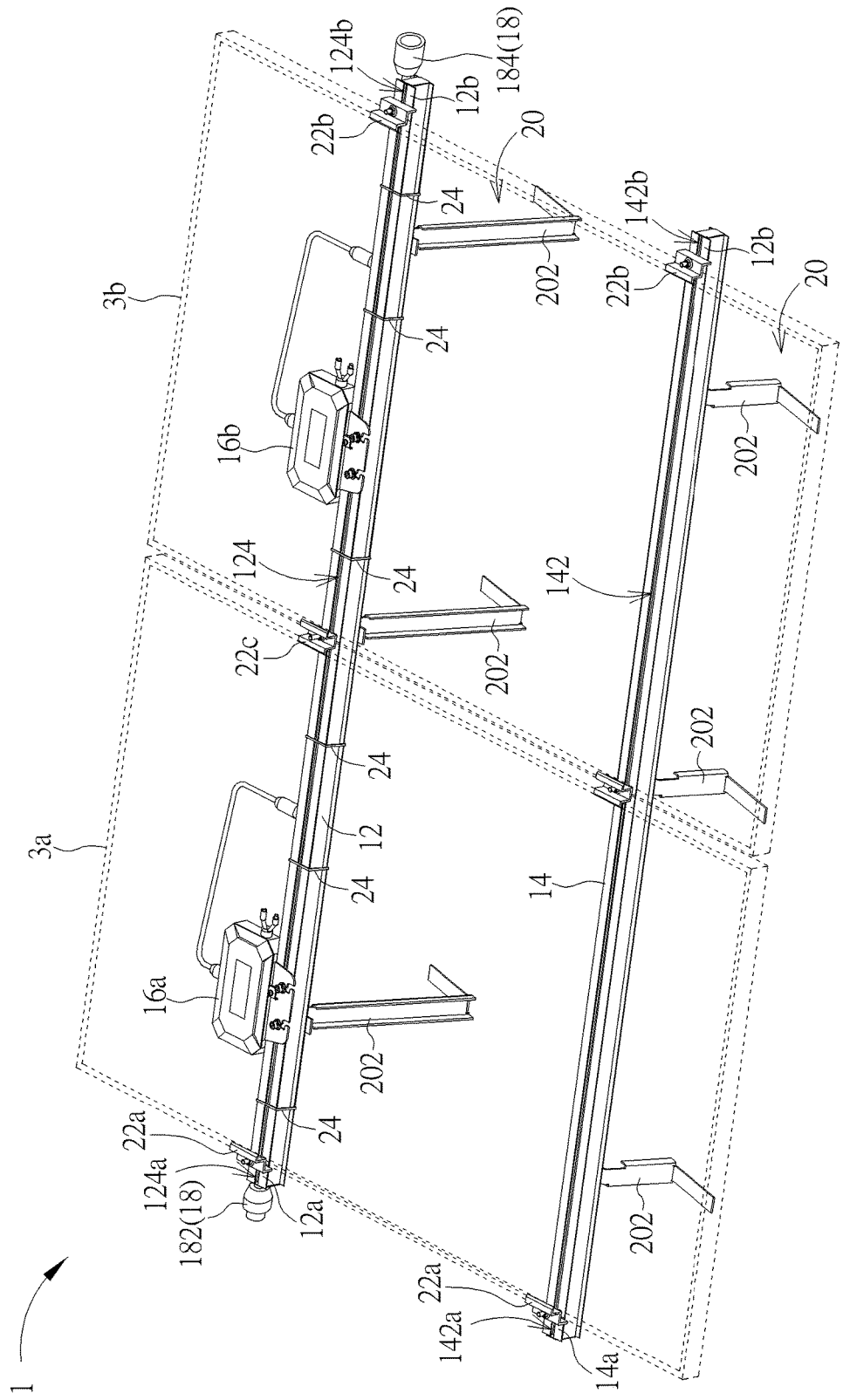
FIG. 1 is a schematic diagram illustrating a supporting device of an embodiment according to the invention.
Figure 2:
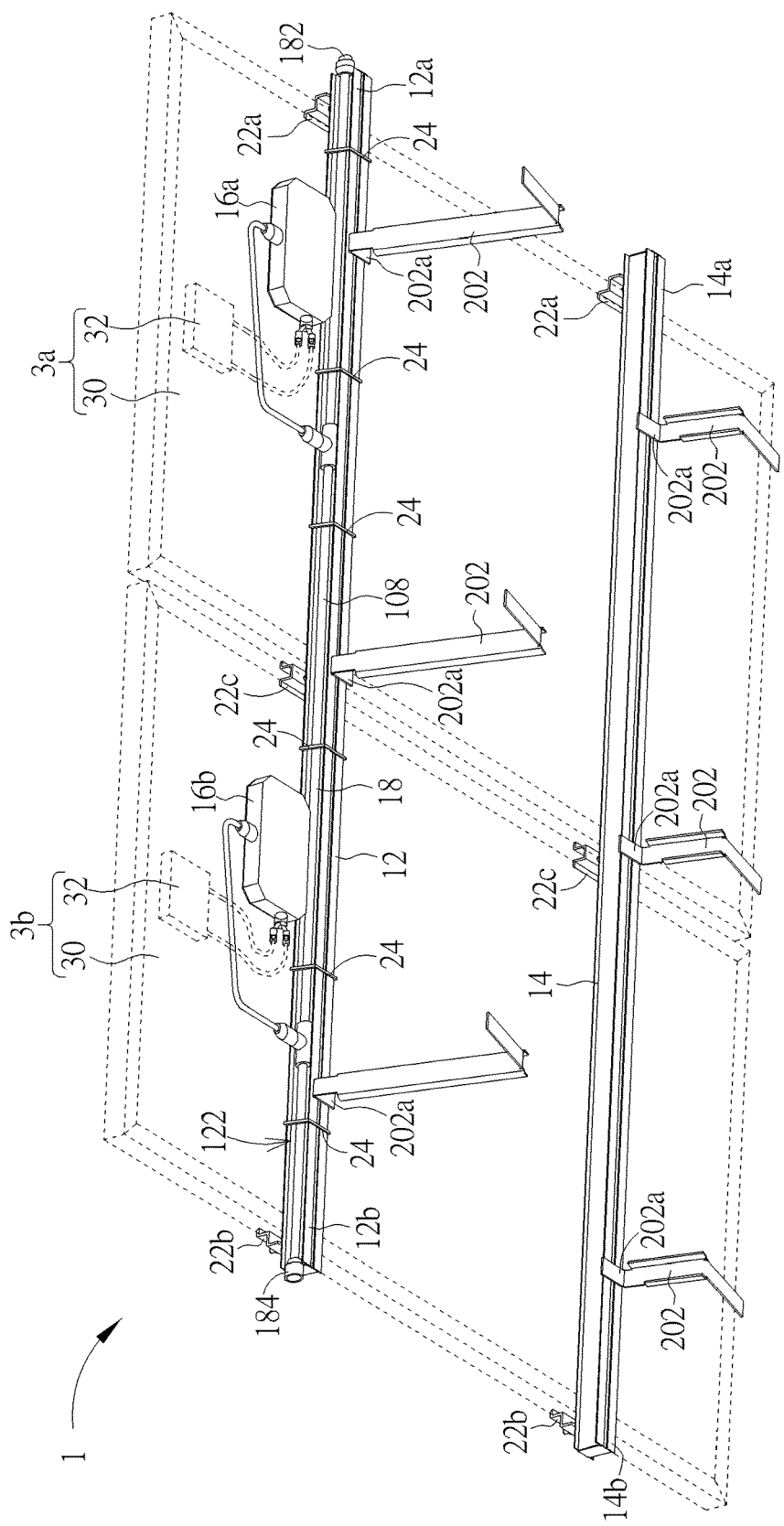
FIG. 2 is a bottom view of the supporting device in FIG. 1.
Figure 3:
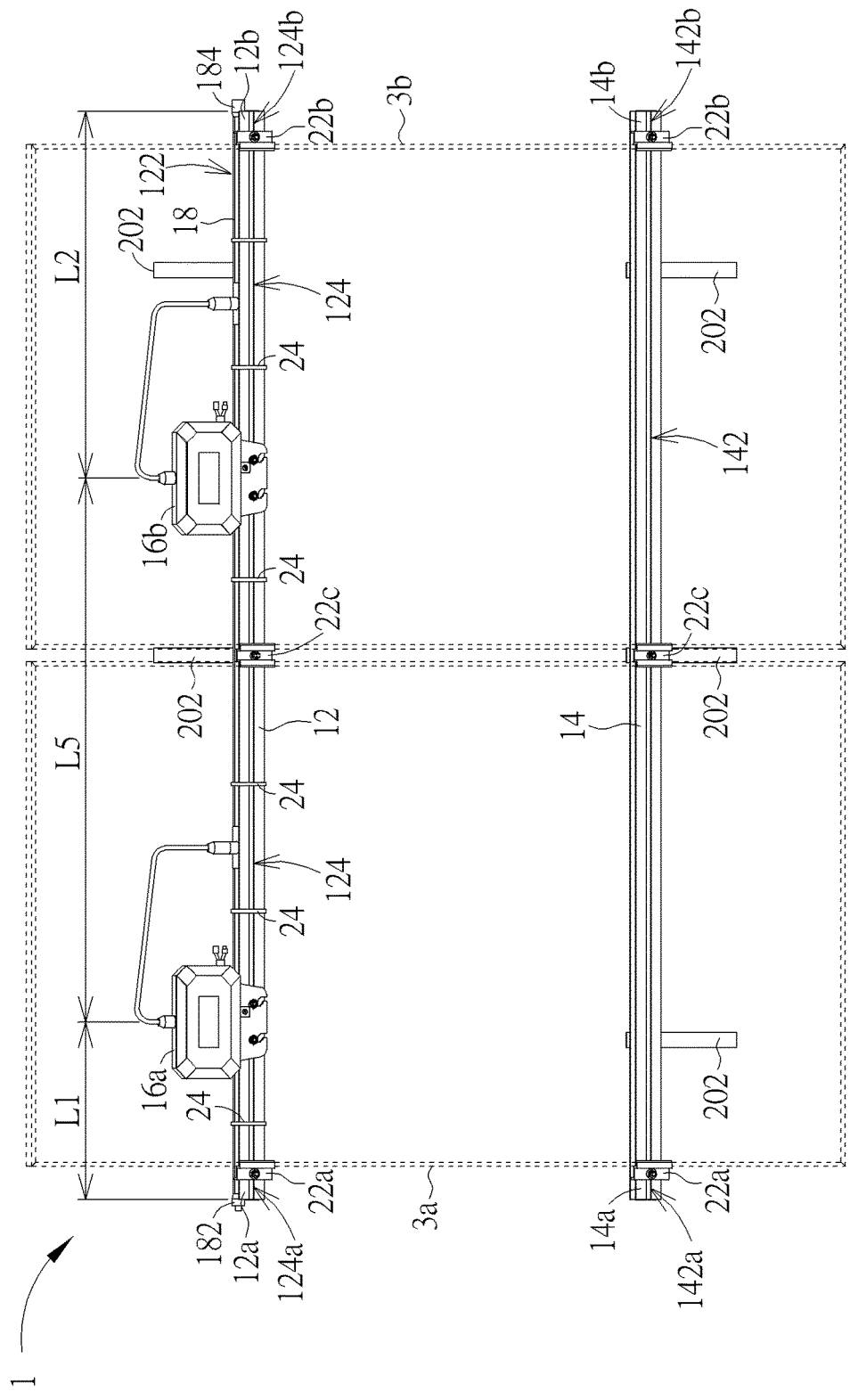
FIG. 3 is a top view of the supporting device in FIG. 1.
Figure 4:
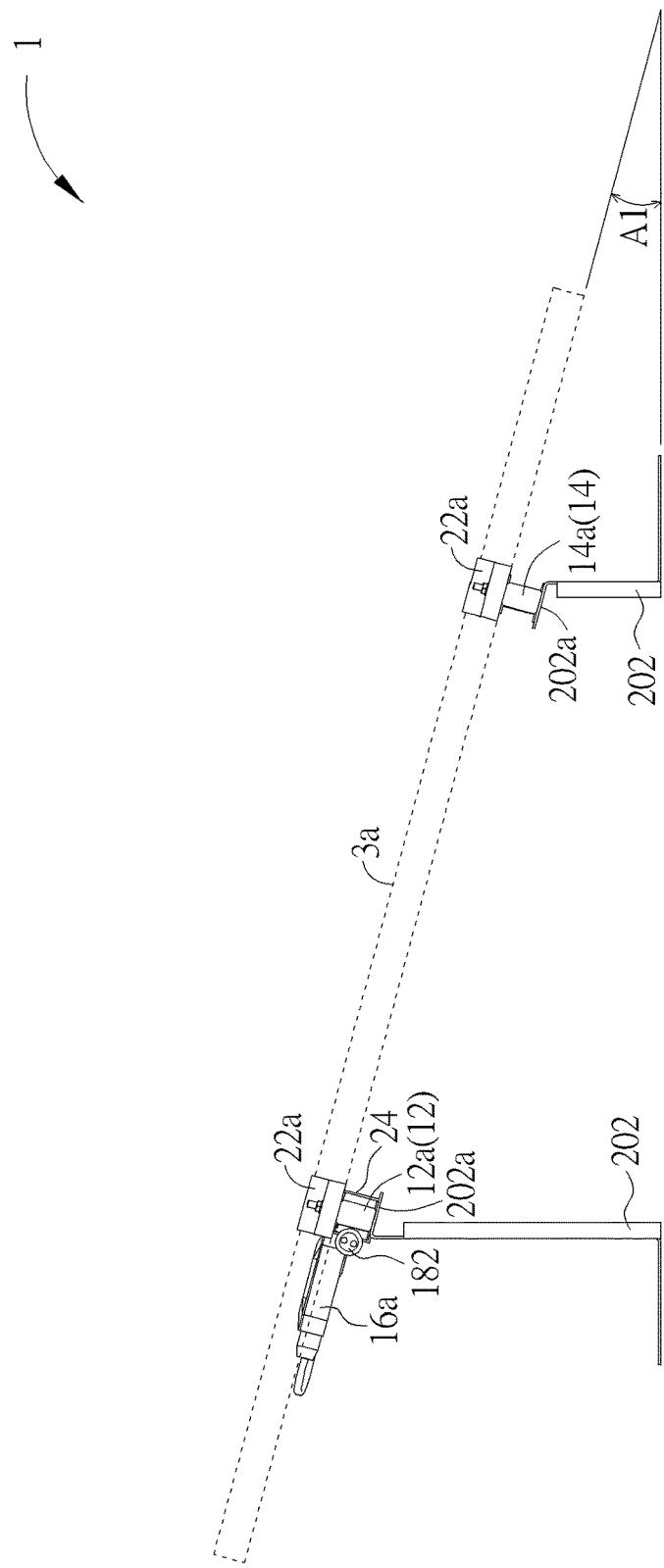
FIG. 4 is a side view of the supporting device in FIG. 1.
Figure 5:
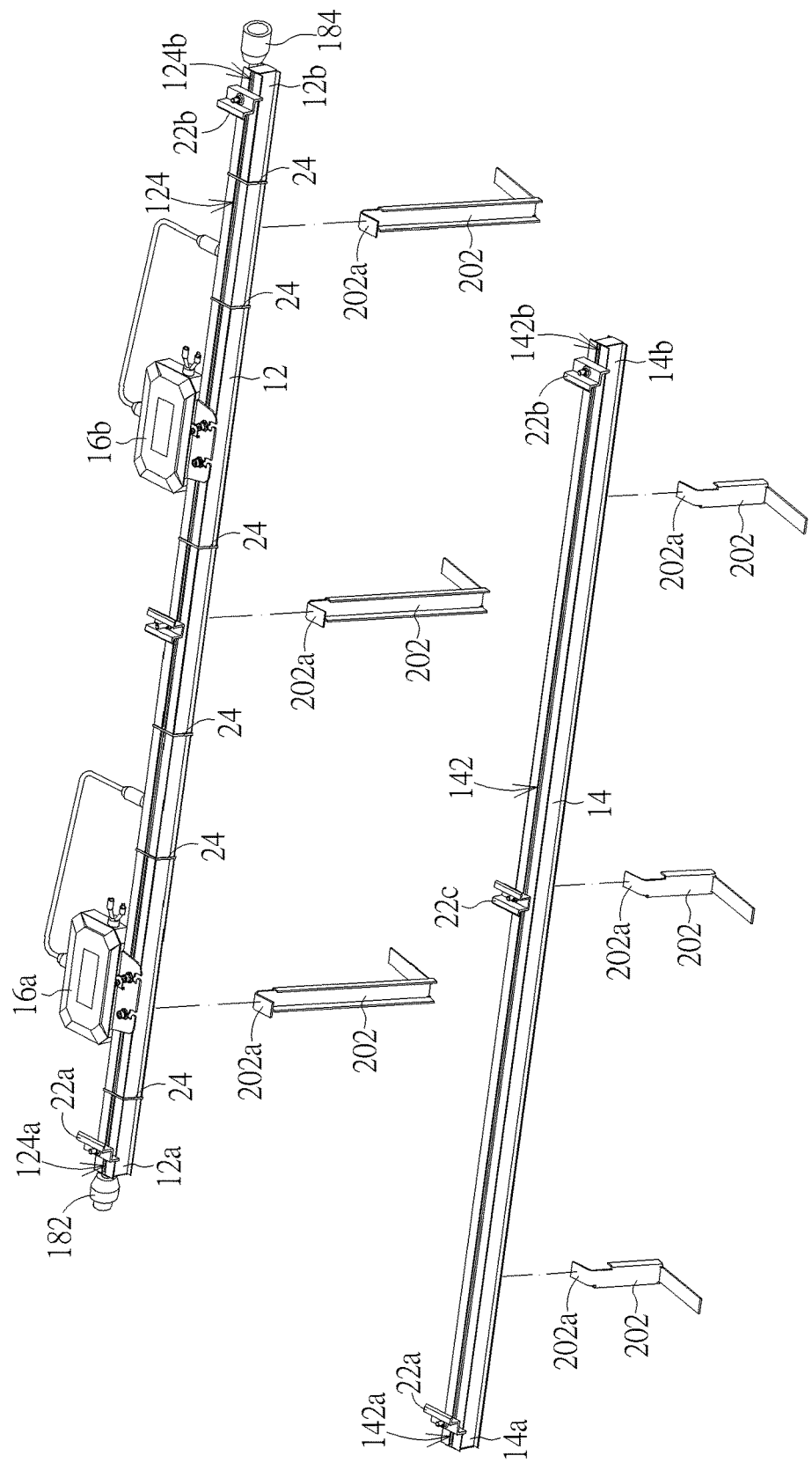
FIG. 5 is a partially-exploded view of the supporting device in FIG. 1.

Please refer to FIGS. 1 to 5. FIG. 1 is a schematic diagram illustrating a supporting device 1 of an embodiment according to the invention. FIG. 2 is a bottom view of the supporting device 1. FIG. 3 is a top view of the supporting device 1. FIG. 4 is a side view of the supporting device 1. FIG. 5 is a partially-exploded view of the supporting device 1. The supporting device 1 is set at a designated installation site, for example the top floor or roof of a building, to support photovoltaic panels 3a and 3b thereon. The photovoltaic panels 3a and 3b are shown in dashed lines in the figures. The supporting device 1 includes a first frame support 12, a third frame support 14, at least one first power inverters 16a and 16b, a first power cable 18, and a leg supporting structure 20. The at least one first power inverters 16a and 16b includes a left power inverter 16a and a right power inverter 16b which are unmovable attached to the first frame support 12. The first frame support 12 and the third frame support 14 are oppositely disposed for supporting the photovoltaic panels 3a and 3b thereon. The leg supporting structure 20 is fixed on a designated installation site, for example a tilted roof of a high building, for connecting and supporting the first frame support 12 and the third frame support 14 in a tilt angle A1 so that the photovoltaic panels 3a and 3b are supported in the tilt angle A1 for a better sunlight receiving efficiency. The left power inverter 16a and the right power inverter 16b are correspondingly electrically connected to the photovoltaic panels 3a and 3b for receiving electricity from the corresponding photovoltaic panel 3a and 3b. The first power cable 18 is attached to the first frame support 12 and electrically connected to the left power inverter 16a and the right power inverter 16b, so that the electricity from the photovoltaic panels 3a and 3b can be transferred through the left power inverter 16a and the right power inverter 16b respectively and the first power cable 18 commonly.

Because most components of the supporting device 1 have been assembled before the supporting device 1 reaching the designated installation site, the assembly process of the supporting device 1 is simplified, so that a user can quickly assemble the supporting device 1, and the necessary time for the user to stay at the dangerous designated installation site to complete assembly and installation work is dramatically reduced. The assembly feature is also conducive to DIY applications, e.g. without professional assistance.

Furthermore, in practice, each of the photovoltaic panels 3a and 3b includes a panel 30 and an output module 32 disposed on a back side of the panel 30. In principle, the quantity of the photovoltaic panels 3a and 3b is equal to the quantity of the first power inverters 16a and 16b, but the invention is not limited thereto. In the embodiment, the left power inverter 16a and the right power inverter 16b are correspondingly electrically connected to the photovoltaic panels 3a and 3b through the output module 32 by engaging mating connectors. The left power inverter 16a and the right power inverter 16b are also electrically connected to the first power cable 18 by engaging mating connectors. The first power cable 18 is attached to the first frame support 12, for example by cable ties 24. In the embodiment, the first frame support 12 has a groove 122, in which the first power cable 18 is disposed. In practice, the first power cable 18 may be attached to the first frame support 12 just by being jammed into the groove 122 without the cable ties 24. In addition, each of the first frame support 12 and the third frame support 14 is usually provided in a bar part and can be made by an extrusion bar which is easily provided with a specific sectional profile so as to form a groove, a sliding slot and so on.

In the embodiment, the supporting device 1 includes a left fixing member 22a, a right fixing member 22b, and a middle fixing member 22c, disposed on each of the first frame support 12 and the third frame support 14. The first frame support 12 has a first frame slot 124. The third frame support 14 has a second frame slot 142. The left fixing members 22a, the right fixing members 22b, and the middle fixing members 22c are adjustably disposed in the first frame slot 124 and the second frame slot 142. The middle fixing member 22c is located between the photovoltaic panels 3a and 3b and fixes the opposite edges of the photovoltaic panels 3a and 3b simultaneously. The left fixing members 22a fix a left edge of the photovoltaic panel 3a. The right fixing members 22b fix a right edge of the photovoltaic panel 3b. Thereby, the photovoltaic panels 3a and 3b are firmly fixed on the frame supports 12 and 14.

Figure 6:
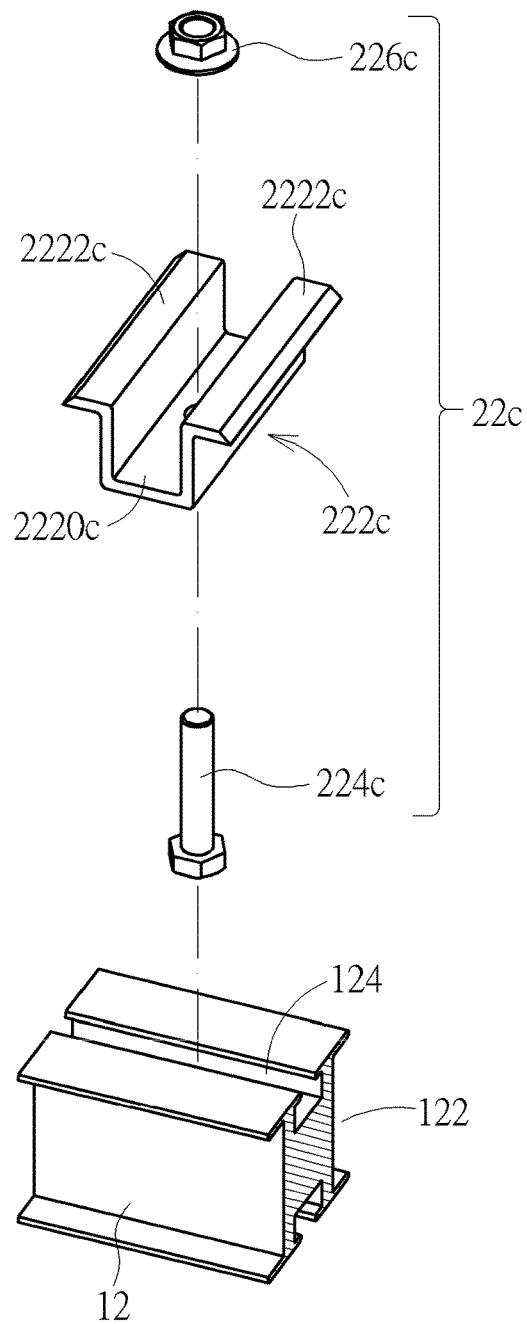
FIG. 6 is a schematic diagram illustrating an exploded view of a middle fixing member and a first frame support of the supporting device in FIG. 1.
Figure 7:
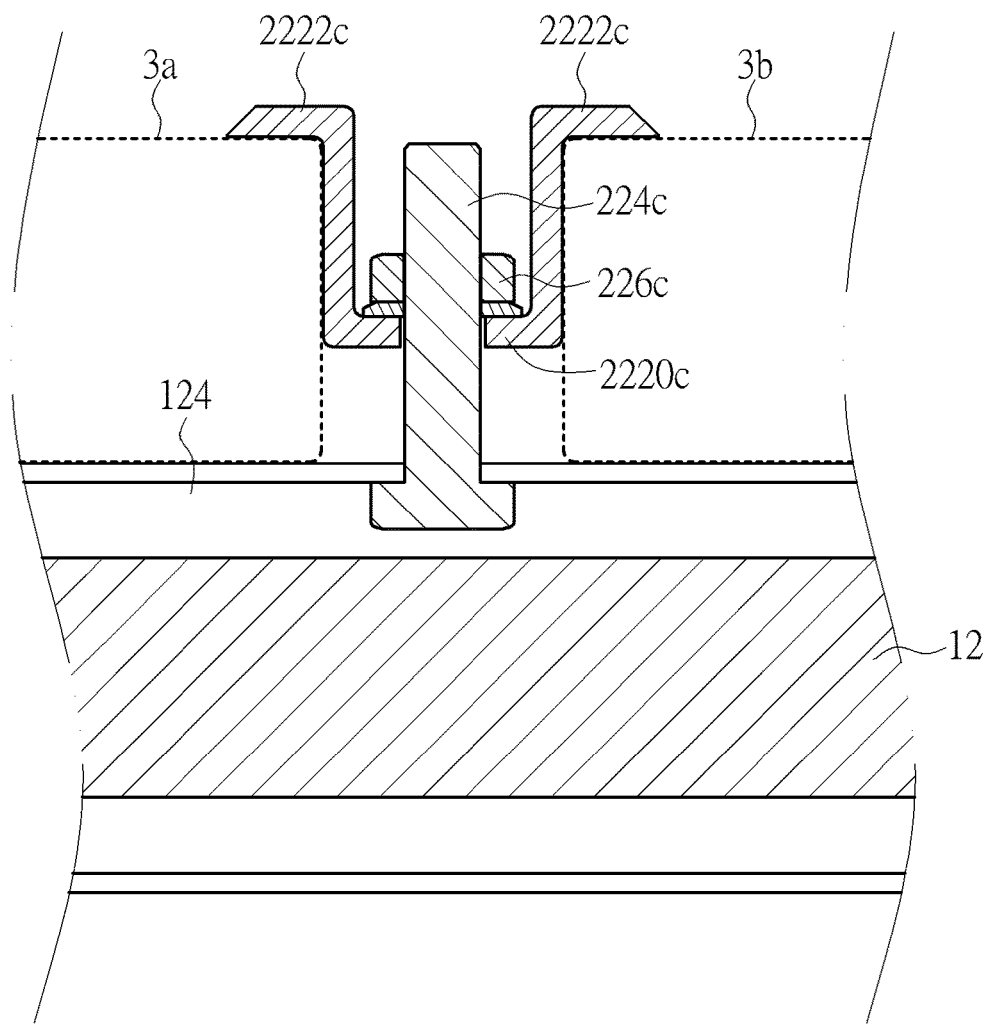
FIG. 7 is a sectional view of the middle fixing member attached on the first frame support of the supporting device in FIG. 1.

For further details, please also refer to FIG. 6 and FIG. 7. FIG. 6 is a schematic diagram illustrating an exploded view of the middle fixing member 22c and the first frame support 12. FIG. 7 is a sectional view of the middle fixing member 22c attached on the first frame support 12. The middle fixing member 22c includes a pressing part 222c, a sliding part 224c connected to the pressing part 222c, and a fastening part 226c connected to the sliding part 224c. The sliding part 224c is a bolt for example. The pressing part 222c has a connection portion 2220c and two pressing portion 2222c extending from opposite sides of the connection portion 2220c. The sliding part 224c is slidably disposed in the first frame slot 124 through the head of the sliding part 224c and is connected to the pressing part 222c by the screw body of the sliding part 224c passing through the connection portion 2220c with the fastening part 226c, for example a hex flange nut screwed on the screw body, so that the two pressing portion 2222c can press the two edges of the opposite edges of the photovoltaic panels 3a and 3b to be firmly fixed on the frame support 12. It is added that in the embodiment, the pressing part 222c has a substantially U-shaped sectional profile and forms a relief space between the pressing portion 2222c, which is conducive to hiding the fastening part 226c and the distal portion of the screw body in the relief space; however, the invention is not limited thereto. In addition, in the embodiment, the structure of the middle fixing member 22c on the third frame support 14 is the same as the middle fixing member 22c for the first frame support 12; therefore, for the details of the middle fixing member 22c disposed on the third frame support 14, please refer to the above relevant descriptions of the middle fixing member 22c on the first frame support 12, which will not be described in addition.

Figure 8:
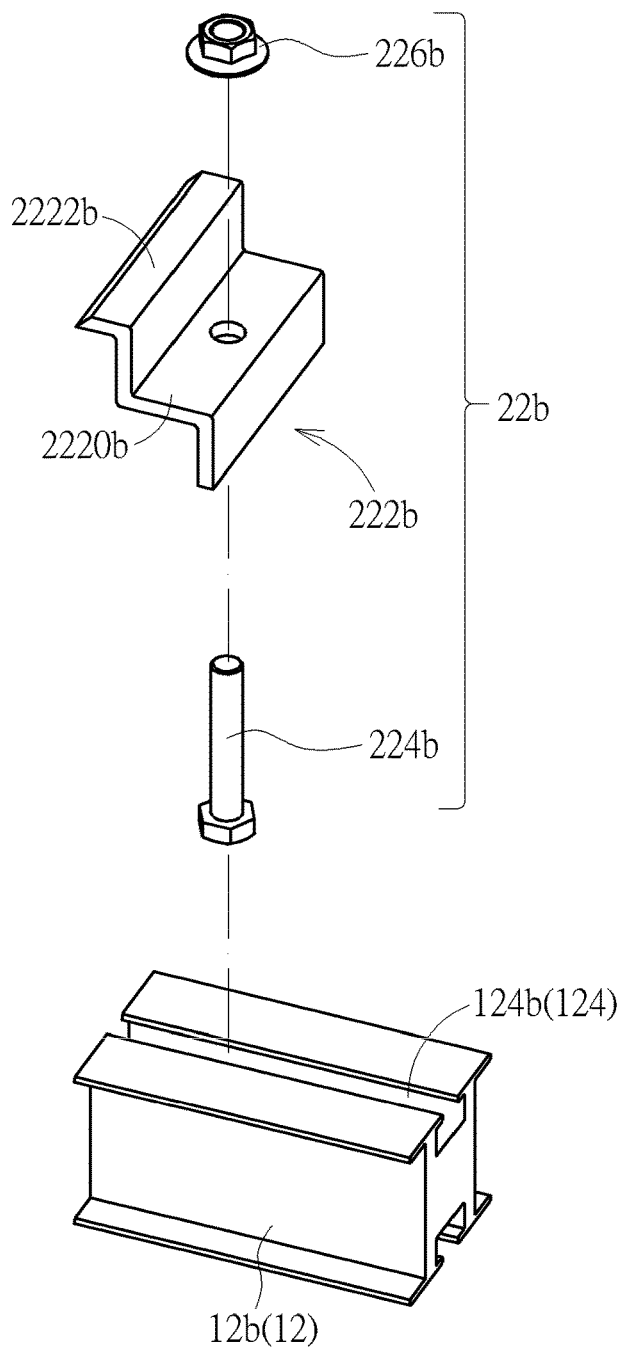
FIG. 8 is a schematic diagram illustrating an exploded view of a right fixing member and the first frame support of the supporting device in FIG. 1.
Figure 9:
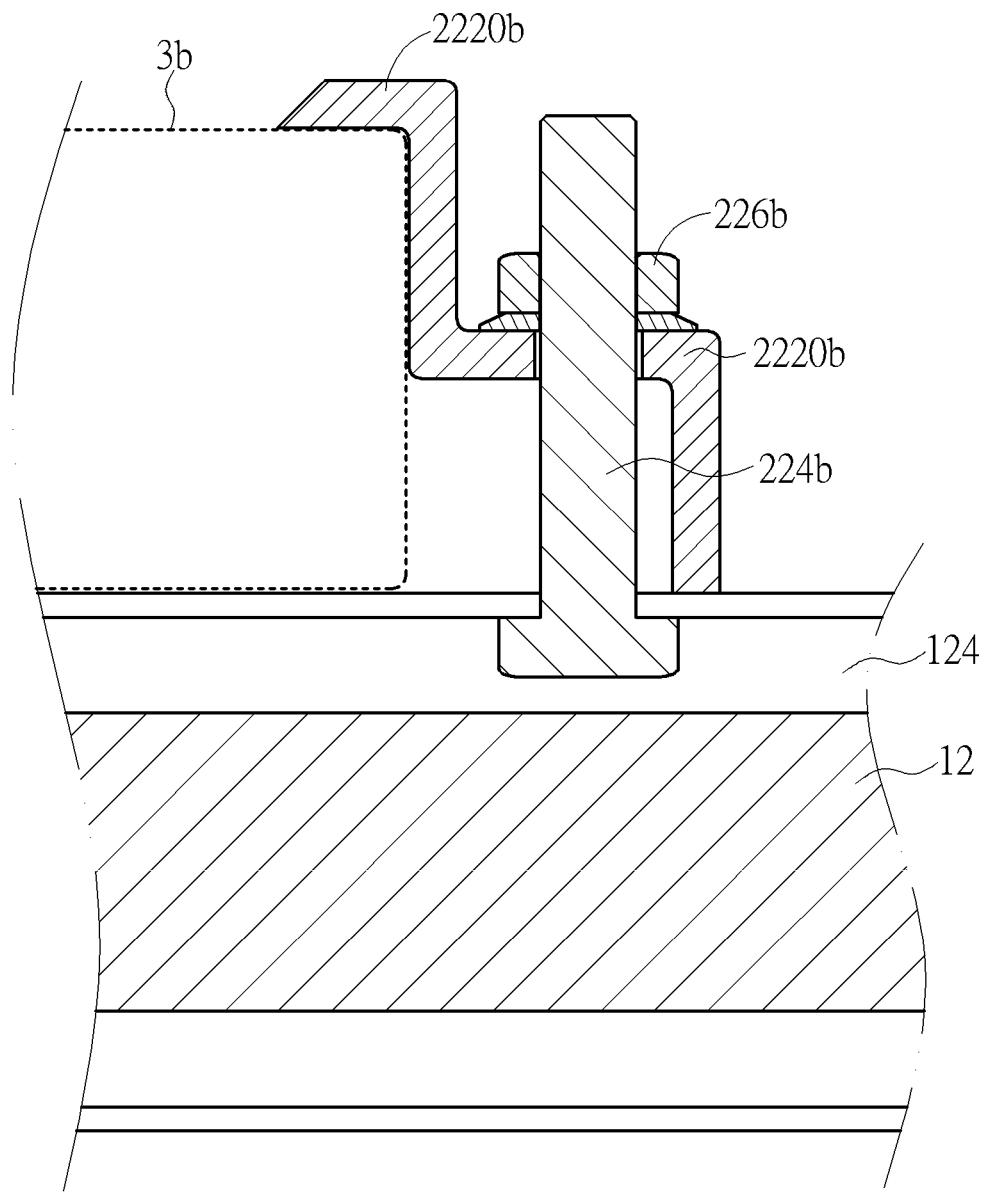
FIG. 9 is a sectional view of the right fixing member attached on the first frame support of the supporting device in FIG. 1.

Please also refer to FIG. 8 and FIG. 9. FIG. 8 is a schematic diagram illustrating an exploded view of the right fixing member 22b and the first frame support 12. FIG. 9 is a sectional view of the right fixing member 22b attached on the first frame support 12. The right fixing member 22b includes a pressing part 222b, a sliding part 224b connected to the pressing part 222b, and a fastening part 226b connected to the sliding part 224b. The sliding part 224b is a bolt for example. The pressing part 222b has a connection portion 2220b and a pressing portion 2222b extending from the connection portion 2220b. The sliding part 224b is slidably disposed in the first frame slot 124 through the head of the sliding part 224b and is connected to the pressing part 222b by the screw body of the sliding part 224b passing through the connection portion 2220b with the fastening part 226b, for example a hex flange nut screwed on the screw body, so that the pressing portion 2222b can press the right edge of the photovoltaic panel 3b to be firmly fixed on the frame support 12. In addition, in the embodiment, the structure of the right fixing member 22b on the third frame support 14 is the same as the right fixing member 22b on the first frame support 12; therefore, for the details of the right fixing member 22b disposed on the third frame support 14, please refer to the above relevant description of the right fixing member 22b on the first frame support 12, which will not be described in addition. Furthermore, in the embodiment, the left fixing member 22a and the right fixing member 22b are structurally the same and are symmetrically disposed. Therefore, for the details of the left fixing members 22a disposed on the first frame support 12 and the third frame support 14, please refer to the above relevant description of the right fixing members 22b on the first frame support 12 and the third frame support 14, which will not be described in addition.

It is added that in the embodiment, each of the photovoltaic panels 3a and 3b is fixed by both side edges on the first frame support 12 and the third frame support 14. However, the invention is not limited thereto. In practice, for example, it is logically acceptable that the photovoltaic panels 3a can be fixed by one left fixing member 22a pressing the left edge of the photovoltaic panels 3a on the first frame support 12 or the third frame support 14 and by one middle fixing member 22c pressing the ridge edge of the photovoltaic panels 3a on the first frame support 12 or the second third support 14. In this case, it is not necessary for single middle fixing member 22c to simultaneously press the opposite edges of the photovoltaic panels 3a and 3b, and then the middle fixing member 22c can be replaced with a fixing member like the left fixing member 22a or the right fixing member 22b. In another aspect, the middle fixing member 22c also can be used to press only one edge of the photovoltaic panels 3a and 3b with one connection portion 2220c; the other connection portion 2220c keep free of pressing anything accordingly. Based on the feature of the middle fixing member 22c, the left fixing member 22a or the right fixing member 22b can be replaced with the middle fixing member 22c.

In addition, in practice, the output module 32 is usually disposed at the central axis of the back side of the panel 30, so the first power inverters 16a and 16b need to be biasedly disposed relative to the central axis of the back side for avoidance of structurally interfering with the output module 32. In the embodiment, the first frame support 12 has a first end 12a and a second end 12b opposite to the first end 12a. As shown in FIG. 3, a first interval L1 between the first end 12a and the first power inverter 16a closest to the first end 12a (i.e. the left power inverter 16a) is shorter than a second interval L2 between the second end 12b and the first power inverter 16b closest to the second end 12b (i.e. the right power inverter 16b). Therein, for convenience, the central position of the first power inverter 16a is regarded as the reference position for the determination of the first interval L1, similarly, the central position of the second power inverter 17a for the determination of the second interval L2. Because the photovoltaic panels 3a and 3b are symmetrically disposed on the first frame support 12, the left power inverter 16a and the right power inverter 16b are biasedly located relative to the photovoltaic panels 3a and 3b respectively. Furthermore, in practice, the first frame support 12 can be provided with a mark thereon for quickly locating the middle fixing member 22c so that the photovoltaic panels 3a and 3b can be quickly placed on the first frame support 12 without interference with the left power inverter 16a and the right power inverter 16b.

Furthermore, in another aspect of the embodiment, the first frame slot 124 has a left slot end 124a and a right slot end 124b opposite to the left slot end 124a. Both the left power inverter 16a and the right power inverter 16b are unmovable attached to the first frame support 12 between the left slot end 124a and the right slot end 124b, for example but not limited to by screwing to the first frame slot 124. The middle fixing member 22c is located between the left power inverter 16a and the right power inverter 16b. The left power inverter 16a is closer to the left slot end 124a than the right power inverter 16b. The left fixing member 22a is located between the left slot end 124a and the left power inverter 16a. The right power inverter 16b is closer to the right slot end 124b than the left power inverter 16a. The right fixing member 22b is located between the right slot end 124b and the right power inverter 16b.

Figure 10:
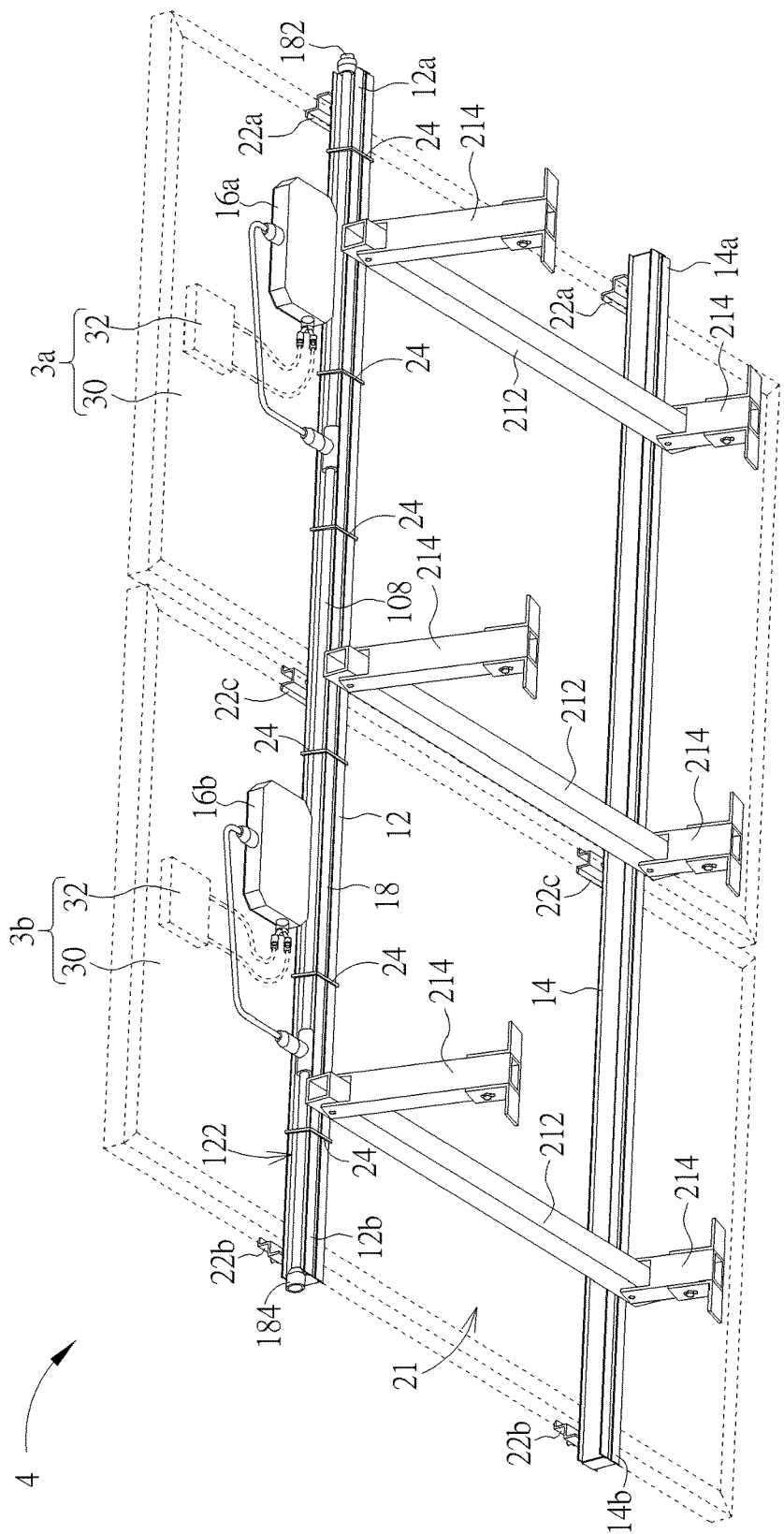
FIG. 10 is a schematic diagram illustrating a supporting device of another embodiment according to the invention.

In the embodiment, the leg supporting structure 20 includes plurality of leg supports 202. Each leg support 202 has an angled end 202a. The leg supporting structure 20 uses the angled ends 202a to connect and support the first frame support 12 and the third frame support 14 in the tilt angle A1, as shown by FIGS. 1, 4 and 5. Therein, the first frame support 12 and the third frame support 14 surface contact the oblique surfaces of the angled ends 202a and are fixed thereon, for example by screws. Therefore, the photovoltaic panels 3a and 3b are supported in the tilt angle A1. In practice, the tilt disposition of the photovoltaic panels 3a and 3b can be achieved by another leg supporting structure. As shown by FIG. 10, which is a schematic diagram illustrating a supporting device 4 of another embodiment according to the invention, the supporting device 4 is substantially the same as the supporting device 1 except for a leg supporting structure 21 of the supporting device 4. For other descriptions of the supporting device 4, please refer to relevant descriptions of the supporting device 1, which will not be repeated in addition. The supporting device 4 uses the leg supporting structure 21 to connect and support the first frame support 12 and the third frame support 14 in the tilt angle A1. The leg supporting structure 21 includes a plurality of connecting bars 212 and a plurality of leg supports 214. The connecting bars 212 connect the frame support 12 and the third frame support 14, for example by screws. Each leg support 214 is fixed on the top floor or roof through one end thereof and is pivotally connected to one connecting bar 212 through the other end thereof.

As discussed above, the first frame support 12 and the third frame support 14 are used for supporting the two photovoltaic panels 3a and 3b; however, the invention is not limited thereto. For example, if the first frame support 12 is provided in a length only for one photovoltaic panel (e.g. with one power inverter and two fixing members), the first frame support 12 and the third frame support 14 will support only one photovoltaic panel. For another example, if the first frame support 12 is provided in a length for three or more photovoltaic panels, the first frame support 12 and the third frame support 14 can support three or more photovoltaic panels accordingly.

Figure 11:
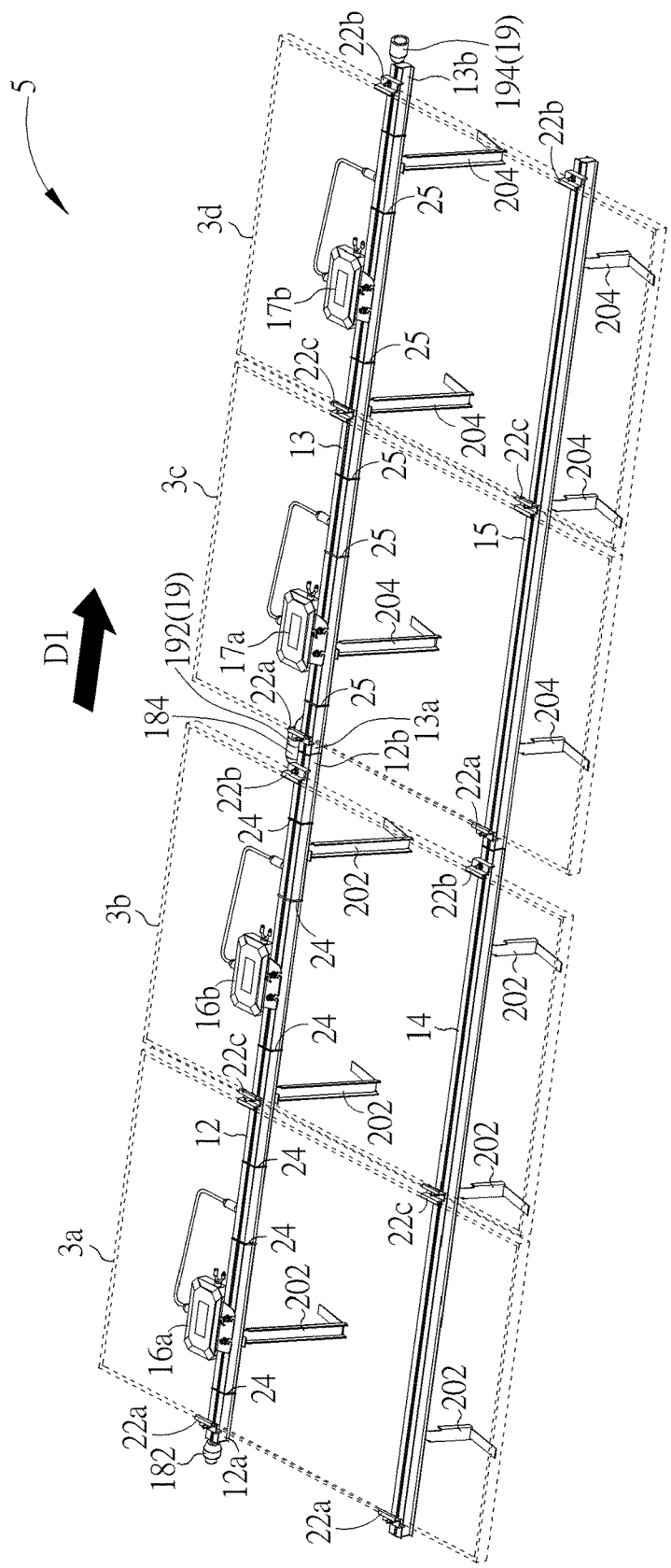
FIG. 11 is a schematic diagram illustrating a supporting device of another embodiment according to the invention.
Figure 12:
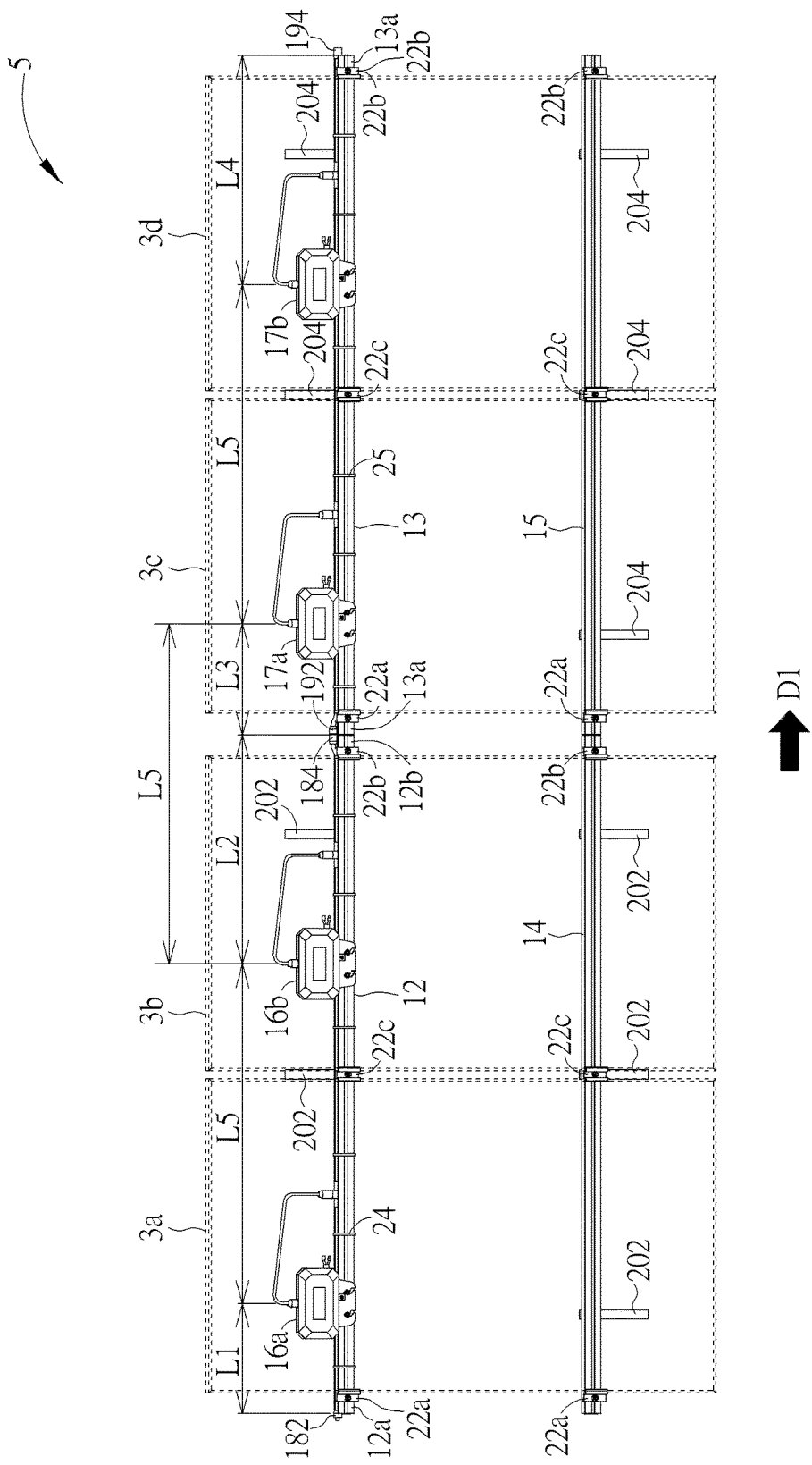
FIG. 12 is a top view of the supporting device in FIG. 11.

In addition, in the embodiment associated with the supporting device 1, the first frame support 12 is provided together with the first power inverters 16a and 16b and the first power cable 18 which are assembled and electrically connected as a module or sub-assembly. As shown in FIGS. 1-3 and 5, the first power cable 18 has a terminal connector 182 at the first end 12a of the first frame support 12 and a mating terminal connector 184 at the second end 12b of the first frame support 12. Therein, in mechanical and electrical structural logic, the terminal connector 182 is capable of engaging with the mating terminal connector 184. Therefore, in practice, it is practicable to arrange more first frame supports 12 and the third frame supports 14 in a row for supporting more photovoltaic panels. Please refer to FIG. 11 and FIG. 12. FIG. 11 is a schematic diagram illustrating a supporting device 5 of another embodiment according to the invention. FIG. 12 is a top view of the supporting device 5. In logic, the supporting device 5 includes two sets of the supporting device 1 disposed side by side. Compared with the supporting device 1, the supporting device 5 further includes a second frame support 13, a fourth frame support 15, at least one second power inverter 17a and 17b attached to the second frame support 13, and a second power cable 19.

The second frame support 13 and the fourth frame support 15 are adjoined and aligned with the first frame support 12 and the third frame support 14 respectively in an arrangement direction D1 (indicated by an arrow in FIG. 12). Another two photovoltaic panels 3c and 3d (shown in dashed lines in FIG. 11 and FIG. 12) are supported on the second frame support 13 and the fourth frame support 15. The at least one second power inverters 17a and 17b are correspondingly electrically connected to one of the photovoltaic panels and receiving electricity from the corresponding photovoltaic panel 3c and 3d. Therein, the second frame support 13 has a third end 13a and a fourth end 13b opposite to the third end 13a in the arrangement direction D1. The third end 13a is adjacent to the second side 12b of the first support frame 12. A third interval L3 between the third end 13a and the second power inverter 17a closest to the third end 13a is shorter than a fourth interval L4 between the fourth end 13b and the second power inverter 17b closest to the fourth end 13b. The second power cable 19 is attached to the second frame support 13 (for example by cable ties 25) and electrically connected to the second power inverters 17a and 17b, so that the electricity from the photovoltaic panels 3c and 3d can be transferred to the terminal connector 192 through the second power inverters 17a and 17b respectively and through the second power cable 19 commonly. The second power cable 19 also has a terminal connector 192 at the third end 13a and a mating terminal connector 194 at the fourth end 13b. The terminal connector 192 (of the second power cable 19) at the third end 13a mates with the mating terminal connector 184 (of the first power cable 18) at the second end 12b. Thereby, the first power cable 18 and the second power cable 19 are electrically connected for integration of transferring the electricity from the photovoltaic panels 3a~d.

It is added that in the embodiment, for a simple illustration, the second frame support 13 and the fourth frame support 15 are structurally identical to the first frame support 12 and the third frame support 14 respectively, but the invention is not limited thereto. For further details of the second frame support 13, the fourth frame support 15, the at least one second power inverters 17a and 17b, and the second power cable 19, please refer to the above relevant descriptions of the first frame support 12, the third frame support 14, the at least one first power inverters 16a and 16b, and the first power cable 18, which will not be described in addition.

Furthermore, in the embodiment, the first interval L1 is equal to the third interval L3. A sum of the first interval L1 and the second interval L2 is equal to an interval L5 between any adjacent two of the at least one first power inverters 16a and 16b and the at least one second power inverters 17a and 17b. For example, as shown by FIG. 12, the interval L5 can be the interval between the first power inverters 16a and 16b, between the first power inverter 16b and the second power inverter 17a, or between the second power inverters 17a and 17b. In logic, in the embodiment, the supporting device 5 can be regarded as a combination of two supporting devices 1, so as to support the four photovoltaic panels 3a~d. Thereby, in practice, a user can treat the supporting device 1 as a modular unit and combine more supporting devices 1 to support more photovoltaic panels. Therein, in practice, the modular unit can be a supporting device capable of supporting more than two photovoltaic panels or just one photovoltaic panel, and the combination can be based on various modular units (i.e. having various supporting capacities).

Furthermore, the leg supporting structure 20 further includes a plurality of leg supports 204 connecting and supporting the second frame support 13 and the fourth frame support 15 in the tilt angle A1. The leg support 204 is identical to the leg support 202. For other descriptions of the leg support 204, please refer to the relevant descriptions of the leg support 202, which will not be repeated. In addition, it is obvious to one of ordinary skill in the art that the leg supporting structure 21 for the supporting device 1 also can be applied to the supporting device 5 by properly modification, which will not be repeated either.

Figure 13:
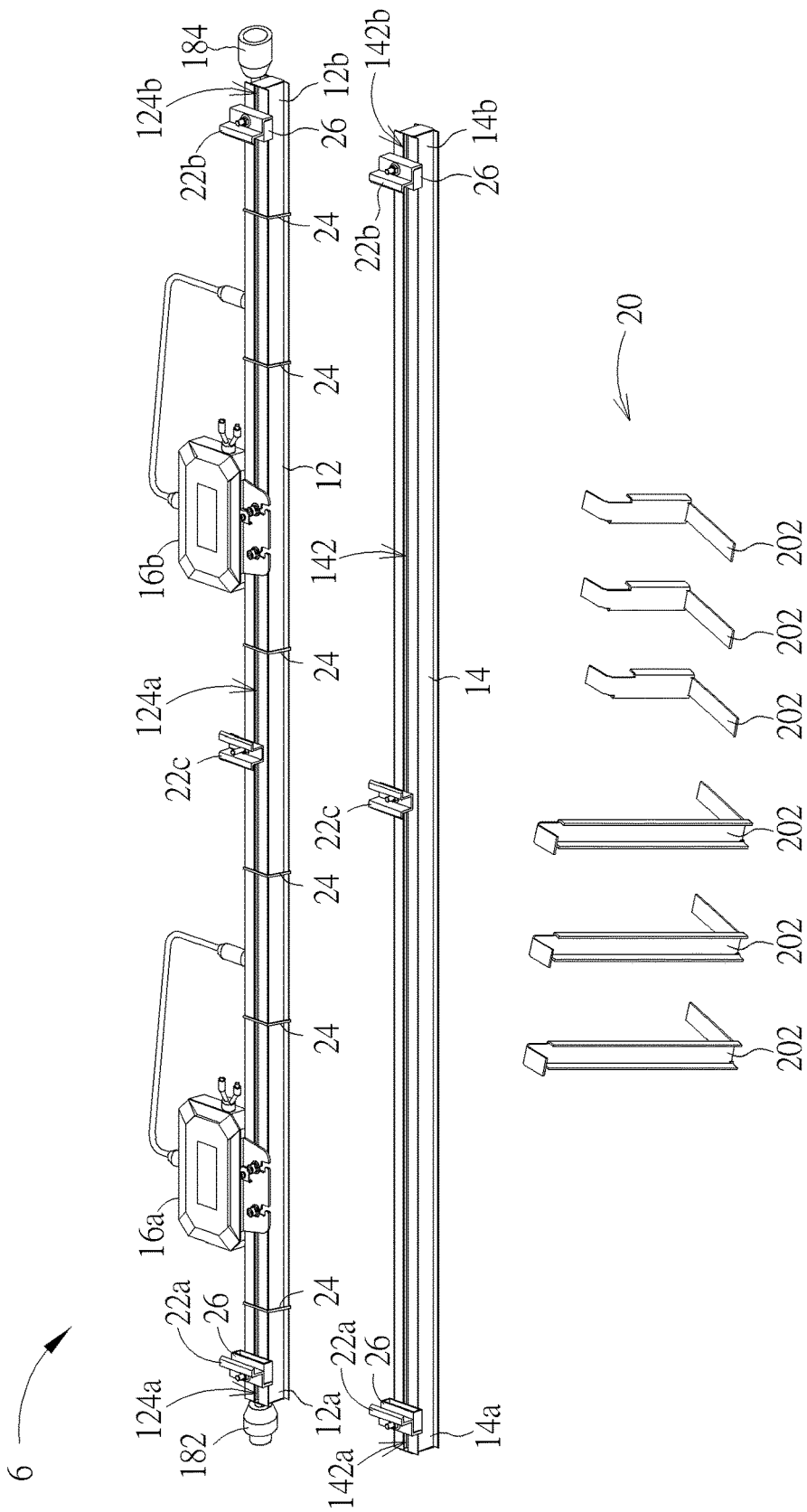
FIG. 13 is a schematic diagram illustrating a kit for forming the supporting device in FIG. 1.

Please refer to FIG. 13, which is a schematic diagram illustrating a kit 6 for forming the supporting device 1. In the following, for other descriptions of the kit 6 for forming the supporting device 1, please refer to the above relevant descriptions of the supporting device 1 and the relevant figures, which will not be repeated in addition. As shown by FIG. 13, the kit 6 includes the first frame support 12, the third frame support 14, the at least one first power inverters 16a and 16b, the first power cable 18, and the leg supporting structure 20. The first frame support 12 is used for being disposed for supporting the at least one photovoltaic panels 3a and 3b thereon. The third frame support 14 is used for being disposed corresponding to the first frame support 12 for supporting the at least one photovoltaic panels 3a and 3b thereon. The at least one first power inverters 16a and 16b is firmly attached to the first frame support 12 and used for correspondingly electrically connected to the at least one photovoltaic panels 3a and 3b and receiving electricity from the corresponding photovoltaic panels 3a and 3b. The leg supporting structure 20 is used for being disposed for connecting and supporting the first frame support 12 and the third frame support 14 in the tilt angle A1. Therein, before the kit 6 is assembled to form the supporting device 1, the above components are separate, except for the at least one first power inverters 16a and 16b having been firmly attached to the first frame support 12, and the first power cable 18 having been attached to the first frame support 12 (in practice, further electrically connected to the at least one first power inverters 16a and 16b). Therefore, most of the components of the kit 6 have been connected in advance, so that a user can quickly assemble the kit 6 to form the supporting device 1.

Furthermore, for the pre-assembling of the at least one first power inverters 16a and 16b, each of the first power inverters 16a and 16b is firmly attached to a first position (as shown by FIG. 13) on the first frame support 12 before the kit 6 is placed at a designated installation site (for example the top floor or roof of a building). When the first frame support 12 is under assembly for being attached to the photovoltaic panels 3a and 3b at the designated installation site, the first power inverter 16a and 16b correspondingly maintain at the corresponding first positions. In other words, the first power inverters 16a and 16b are fixed at the same positions (i.e. the corresponding first positions) on the first frame support 12 before and after the assembly of the supporting device 1.

Furthermore, please also refer to FIG. 3, the kit 6 includes the left fixing member 22a, the right fixing member 22b, and the middle fixing member 22c on each of the first frame support 12 and the third frame support 14, movably connected with the first frame slot 124 and the second frame slot 142 and used for fixing one of the at least one photovoltaic panels 3a and 3b. Take the left fixing member 22a, the right fixing member 22b, and the middle fixing member 22c on the first frame support 12. The middle fixing member 22c is movable only between the left power inverter 16a and the right power inverter 16b. The left fixing member 22a is movable between the left slot end 124a and the left power inverter 16a. The right fixing member 22b is movable between the right slot end 124b and the right power inverter 16b.

Figure 14:
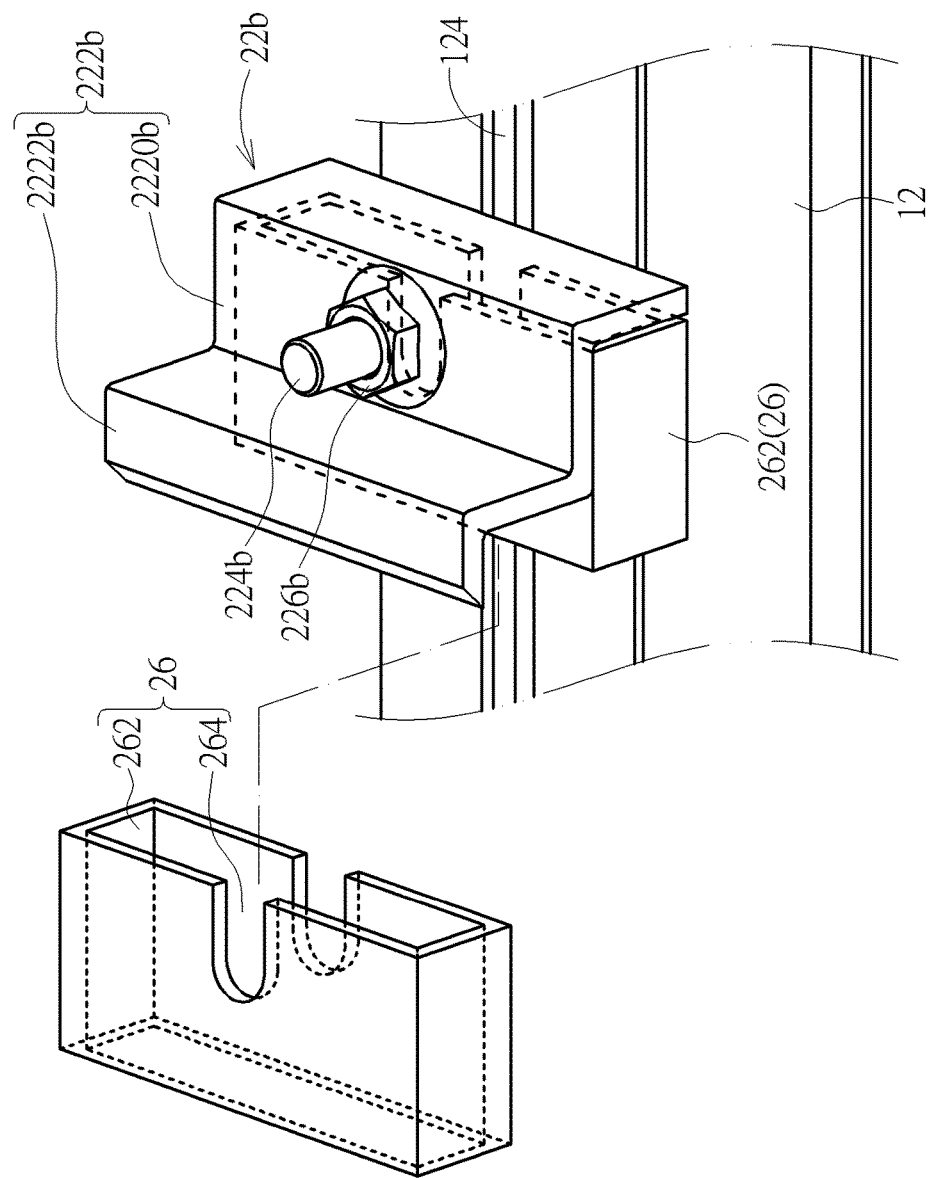
FIG. 14 is an enlarged view of the right fixing member attached on the first frame support of the kit in FIG. 13.

Regarding the right fixing member 22b on the first frame support 12, please also refer to FIGS. 8, 9 and 14. FIG. 14 is an enlarged view of the right fixing member 22b attached on the first frame support 12 of the kit 6. The kit 6 further includes a retainer 26 for the right fixing member 22b on each of the first frame support 12 and the third frame support 14. The portion of the retainer 26 in FIG. 14 hidden by the right fixing member 22b is shown in hidden lines; therein, the retainer 26 is also shown by an enlarged one in FIG. 14 for a clear whole picture of the retainer 26. The retainer 26 is disposed between the first frame support 12 and the right fixing member 22b for maintaining an orientation of the right fixing member 22b.

Furthermore, the retainer 26 has a body 262 and a notch 264 formed on the body 262. The body 262 is disposed between the first frame support 12 and the pressing part 222b with the sliding part 224b fitting in the notch 262, so that the orientation of the right fixing member 22b is maintained, with avoidance of jamming in the first frame slot 124 for example. Similarly, the kit 6 also includes another retainer 26 for the left fixing member 22a on each of the first frame support 12 and the third frame support 14 for maintaining an orientation of the left fixing member 22a. In addition, in the embodiment, the middle fixing member 22c has the substantially U-shaped sectional profile with a flat central bottom surface, so the middle fixing member 22c can maintain its orientation by itself without any retainer 26, e.g. the retainer 26.

Based on the above descriptions for the kit 6 and the supporting device 1, a kit for forming the supporting device 5 will be realized by further including the second frame support 13, the fourth frame support 15, the at least one second power inverters 17a and 17b attached to the second frame support 13, and the second power cable 19 attached to the second frame support 13. In logic, the kit for forming the supporting device 5 can be regarded as a collection of two sets of the kit 6 and realized easily by one of ordinary skill in the art based on the above descriptions about the kit 6 and the relevant descriptions. For the further details about the kit for forming the supporting device 5, please refer to the above descriptions about the kit 6 and the relevant descriptions, which will not be repeated.

Figure 15:
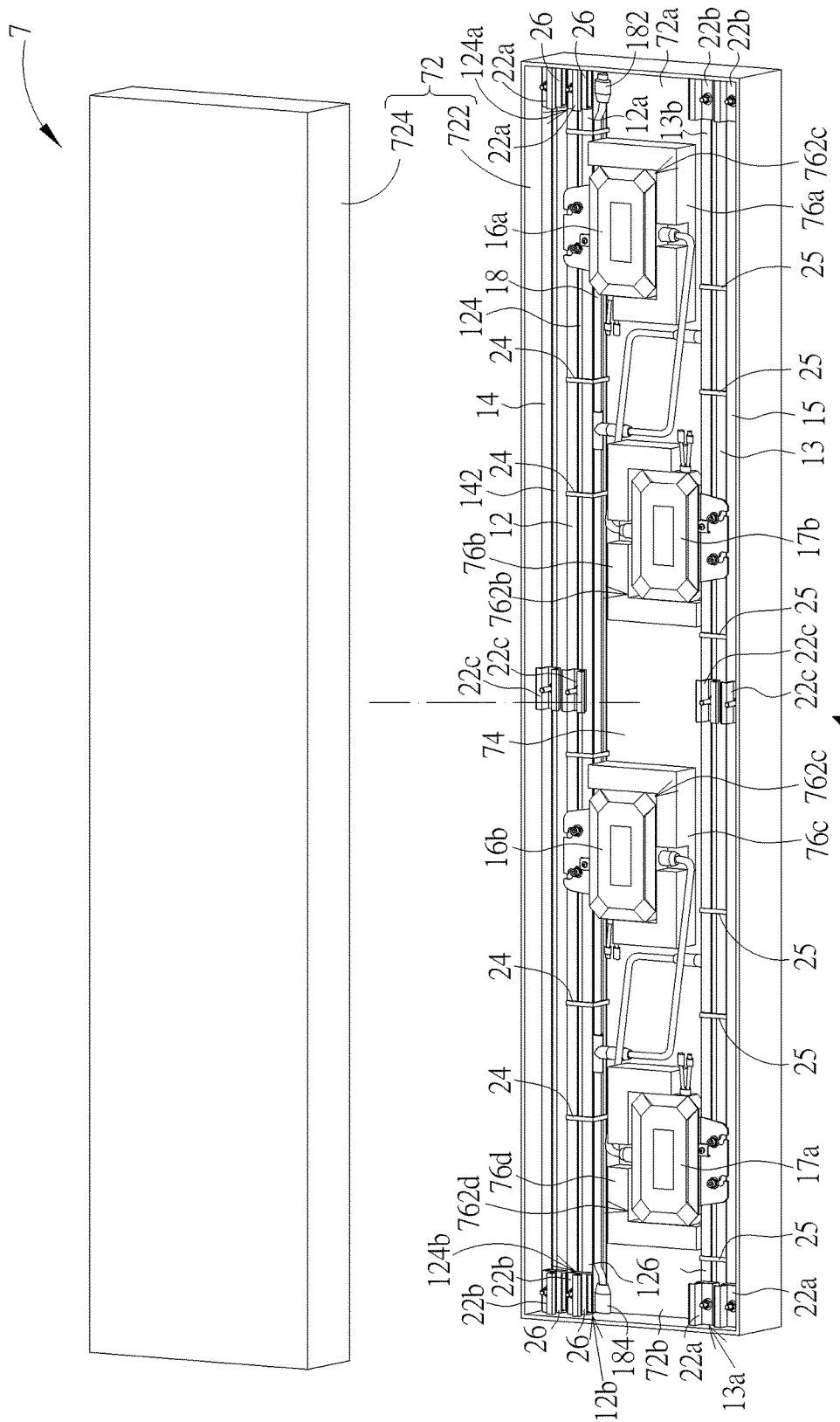
FIG. 15 is a schematic diagram illustrating a package according to the invention.
Figure 16:
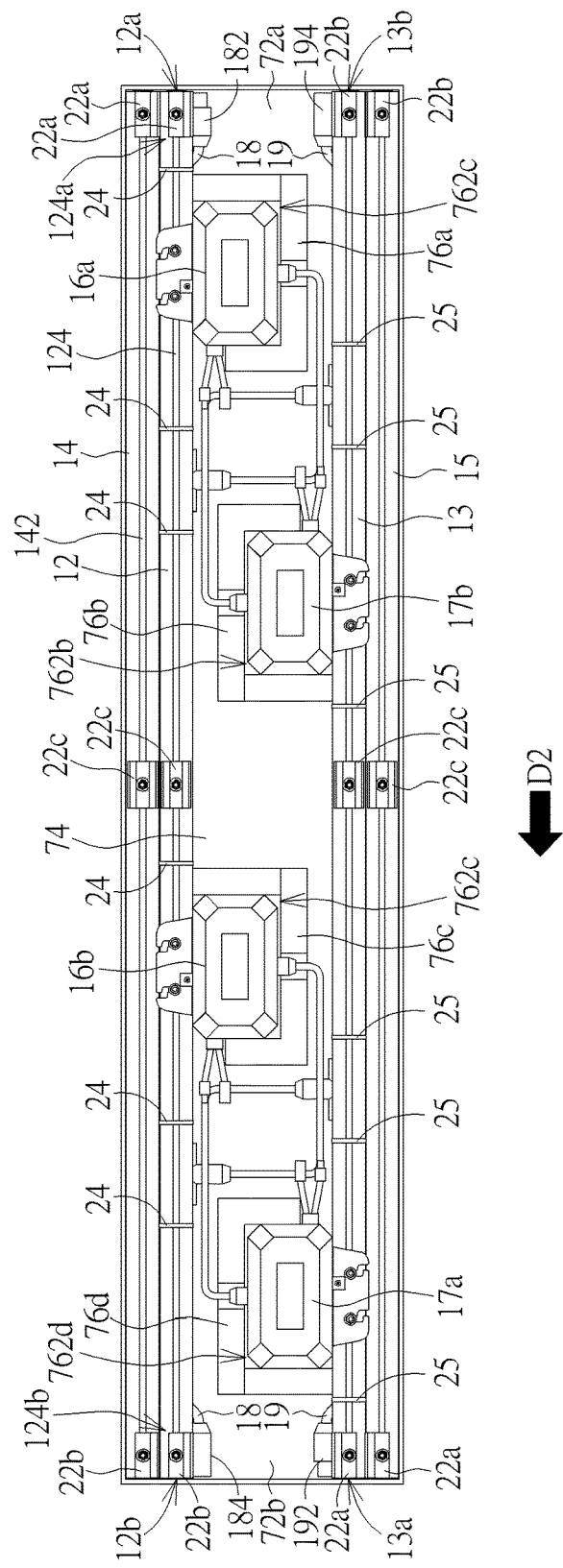
FIG. 16 is a top view of the interior of the package in FIG. 15.

In addition, in practice, the kit 6 can be packed up in any form for transport, for example by ties. For transport convenience, the kit 6 can be packed into a container, e.g. a box. Please refer to FIG. 15 and FIG. 16. FIG. 15 is a schematic diagram illustrating a package 7, which is partially-exploded, of the supporting device 5. FIG. 16 is a top view of the interior of the package 7. The package 7 includes a container 72 and the components for forming the supporting device 5. The components are accommodated in the container 72, which facilitates storage or transport. In the embodiment, the container 72 includes a body 722 and a cover 724 (which is not shown in FIG. 16). In FIG. 15, the container 72 is opened. In logic, the package 7 can be treated as two sets of the kit 6 packed into the container 72. In the following, for other descriptions of the package 7, please refer to the above relevant descriptions of the supporting devices 1 and 5 and the kit 6 and the relevant figures, which will not be repeated in addition.

In the embodiment, the first frame support 12 and the second frame support 13 are oppositely disposed in the container 72; therein, an accommodating space 74 is formed between the first frame support 12 and the second frame support 13. Because each of the first frame support 12 and the second frame support 13 is provided in a bar part, the first frame support 12 and the second frame support 13 are disposed parallel in a direction D2, in which the first frame support 12 and the second frame support 13 extend, and which is conducive to compactly packing. The package 7 includes at least two positioning structures 76a~d fixedly disposed in the accommodating space 74. In practice, the body 722 of the container 72 and the positioning structures 76a~d are integrally made of paper; however, the invention is not limited thereto. The first power inverters 16a and 16b are attached to the first frame support 12. The second power inverters 17a and 17b are attached to the second frame support 13. Each of the first power inverters 16a and 16b and the second power inverters 17a and 17b are structurally constrained by one of the positioning structures 76a~d between the first frame support 12 and the second frame support 13. In the embodiment, each of the positioning structures 76a~d is provided in a U-shaped projection from the top view as FIG. 16 and has a constraint space 762a~d, the power inverters 16a, 16b, 17a and 17b fits in the corresponding constraint spaces 762a~d. The positioning structures 76a~d surround three sides of the corresponding power inverters 16a, 16b, 17a and 17b. By matching the profiles of the constraint spaces 762a~d with the profiles of the corresponding power inverters 16a, 16b, 17a and 17b, the first power inverters 16a and 16b and the second power inverters 17a and 17b can be stably and firmly constrained by the positioning structures 76a~d. However, the invention is not limited thereto. For example, each of the positioning structures 76a~d can be provided in a L-shaped projection, or even a rectangular blocking that also can block the corresponding power inverter 16a, 16b, 17a or 17b or at least provide a guiding effect for locating the corresponding power inverter 16a, 16b, 17a or 17b.

In practice, the first power inverters 16a and 16b can be firmly attached to the first frame support 12 before disposed in the container 72. Alternatively, after the first frame support 12 is disposed in the container 72, the first power inverters 16a and 16b are disposed in the positioning structures 76a and 76c. In other words, in the former case, the first frame support 12 and the first power inverters 16a and 16b having been attached thereto are disposed in the container 72 together, so that the first power inverters 16a and 16b are located in the corresponding positioning structures 76a and 76c. In the latter case, after the first frame support 12 is disposed in the container 72, a user can place the first power inverters 16a and 16b in the corresponding positioning structures 76a and 76c easily and then fix the first power inverters 16a and 16b on the first frame support 12. That is, the positioning structures 76a and 76c provide a positioning effect and facilitate the fixing of the first power inverters 16a and 16b on the first frame support 12.

Furthermore, in the embodiment, the first frame support 12 has the first end 12a and the second end 12b in the direction D2. The second frame support 13 has the fourth end 13b and the third end 13a in the direction D2. The container 72 has a first container end 72a and a second container end 72b opposite to the first container end 72a in the direction D2. The first end 12a and the fourth end 13b are disposed at the first container end 72a. The second end 12b and the third end 13a are disposed at the second container end 72b. Therefore, the first power inverters 16a and 16b and the second power inverters 17a and 17b can be staggered in the accommodating space 74 in the container 72, which is conducive to compactly packing.

Furthermore, in the embodiment, the first power cable 18 and the second power cable 19 are also disposed in the container 72 together with the first frame support 12 and the second frame support 13 respectively. Therein, the first power cable 18 and the second power cable 19 are attached to the first frame support 12 and the second frame support 13 respectively, for example by ties 24 and 25. Further, in practice, the first power cable 18 and the second power cable 19 can be electrically connected to the first power inverters 16a and 16b and the second power inverters 17a and 17b respectively in advance.

Furthermore, in the embodiment, the third frame support 14 and the fourth frame support 15 are oppositely disposed in the container 72 adjacent to the first frame support 12 and the second frame support 13 respectively. Further, the first frame support 12 and the second frame support 13 are located between the third frame support 14 and the fourth frame support 15, which can avoid interference with the first power inverters 16a and 16b and the second power inverters 17a and 17b and is conducive to compactly packing.

Therein, for the first frame support 12 and the third frame support 14, the first frame slot 124 and the second frame slot 142 are disposed upward. The left fixing members 22a, the right fixing members 22b, and the middle fixing members 22c for the first frame support 12 and the third frame support 14 are slidably disposed through the sliding parts thereof (including the sliding parts 224b and 224c) in the first frame support 12 and the second frame support 13. For the first frame slot 124, the middle fixing member 22c is movable at most only between the left power inverter 16a and the right power inverter 16b, the left fixing member 22a is movable at most between the left slot end 124a and the left power inverter 16a, and the right fixing member 22b is movable at most between the right slot end 124b and the right power inverter 16b. For avoidance of jamming in the first frame slot 124, the retainer 26 is used for each of the left fixing member 22a and the right fixing member 22b so that the orientation of each of the left fixing member 22a and the right fixing member 22b is maintained. The above description is also applicable to the left fixing member 22a, the right fixing member 22b, and the middle fixing member 22c for the third frame support 14 and will not repeated. In addition, in the embodiment, the second frame support 13 and the fourth frame support 15 are provided with the fixing members 22a, 22b and 22c, so the above description about the fixing members 22a, 22b and 22c for the first frame support 12 and the third frame support 14 is also applicable to the fixing members 22a, 22b and 22c for the second frame support 13 and the fourth frame support 15 and will not repeated.

It is added that in the embodiment, the frame supports 12, 13, 14 and 15, the positioning structures 76a~d, and the power inverters 16a, 16b, 17a and 17b are disposed substantially at a plane similar to the view plane of FIG. 16, which is conducive to placing or storing the package 7. In addition, the leg supports 202 of the leg supporting structure 20 can be packed separately from the container 72 or disposed in the vacant space in the container 72.

Figure 17:
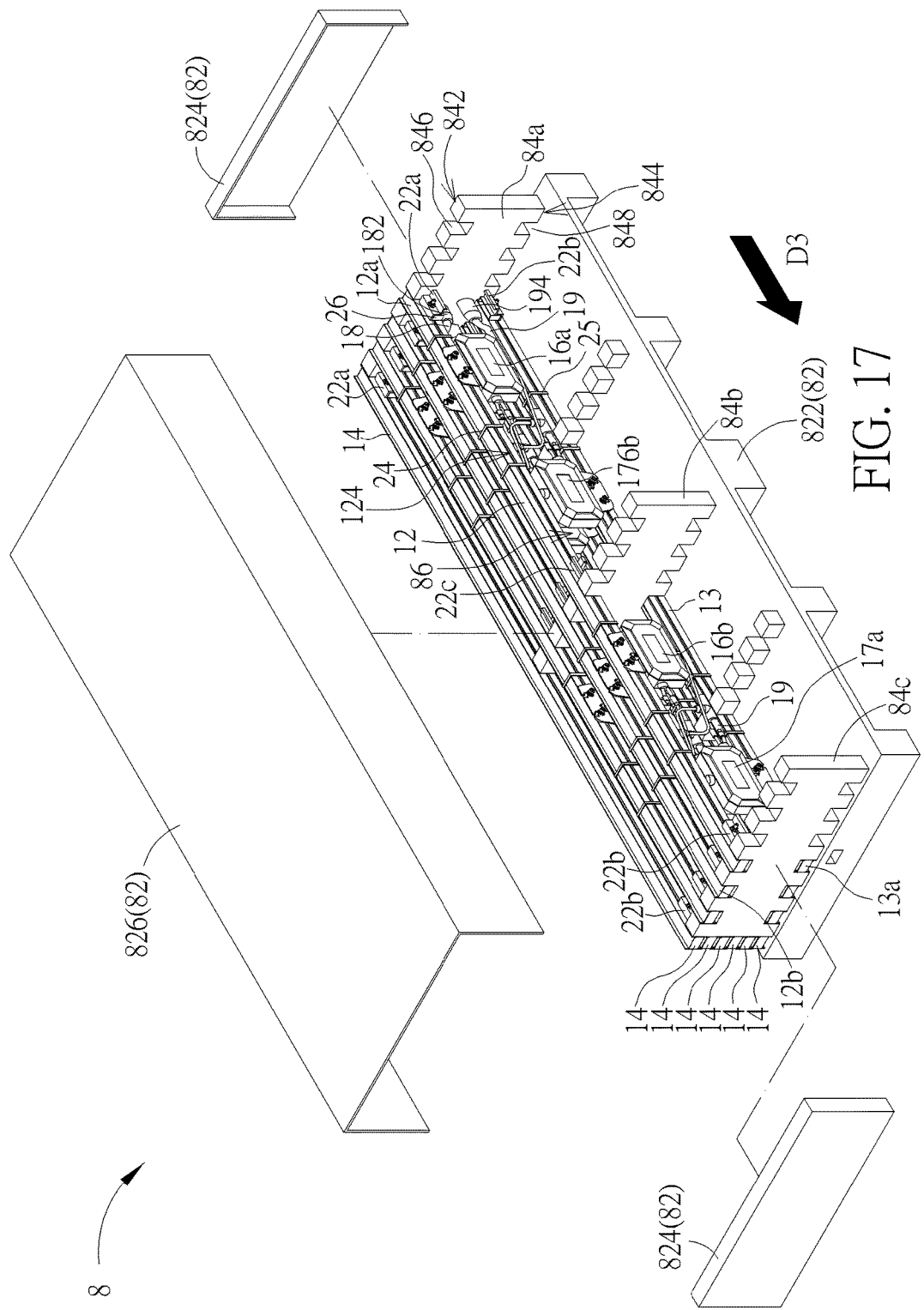
FIG. 17 is a schematic diagram illustrating a package according to the invention.
Figure 18:
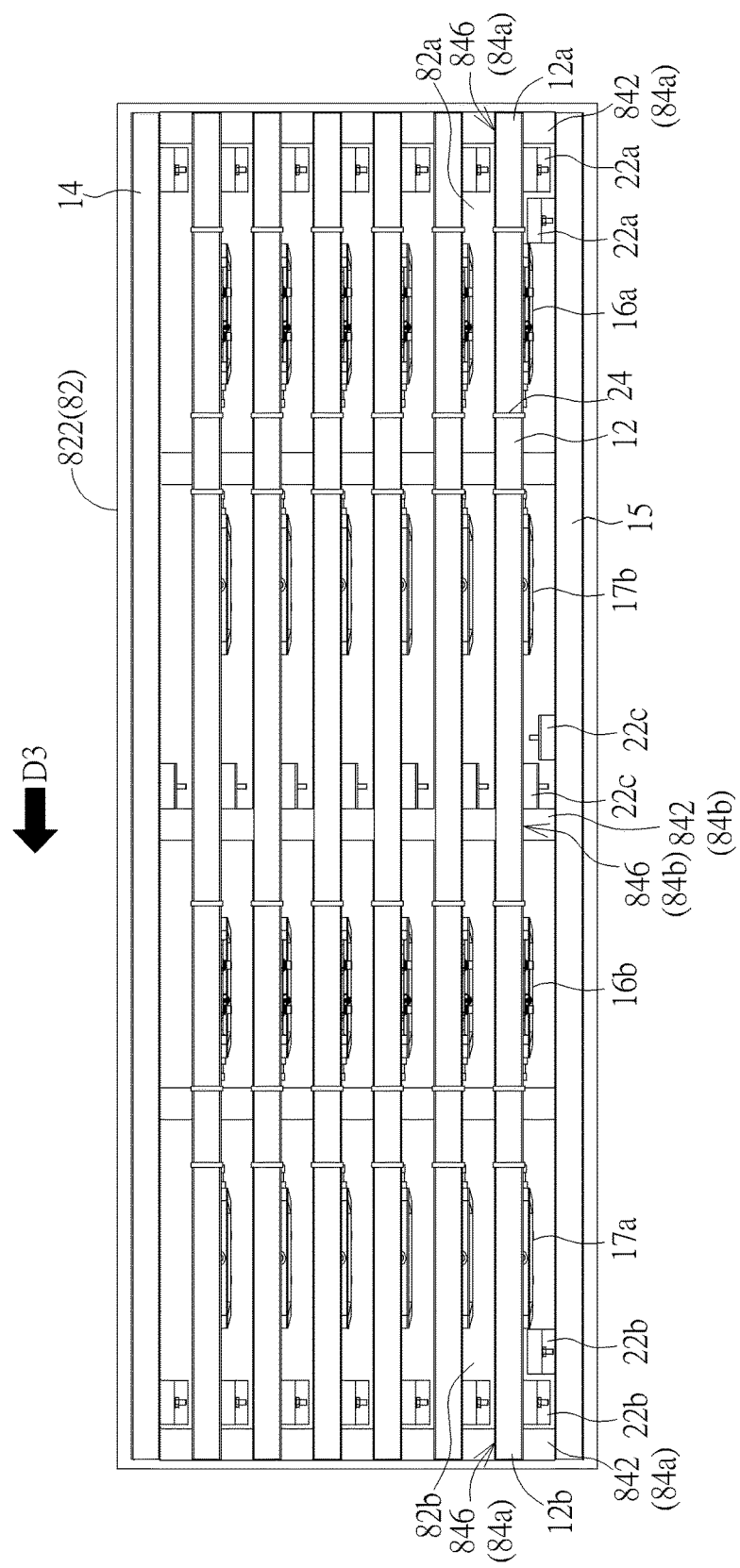
FIG. 18 is a top view of the interior of the package in FIG. 17.
Figure 19:
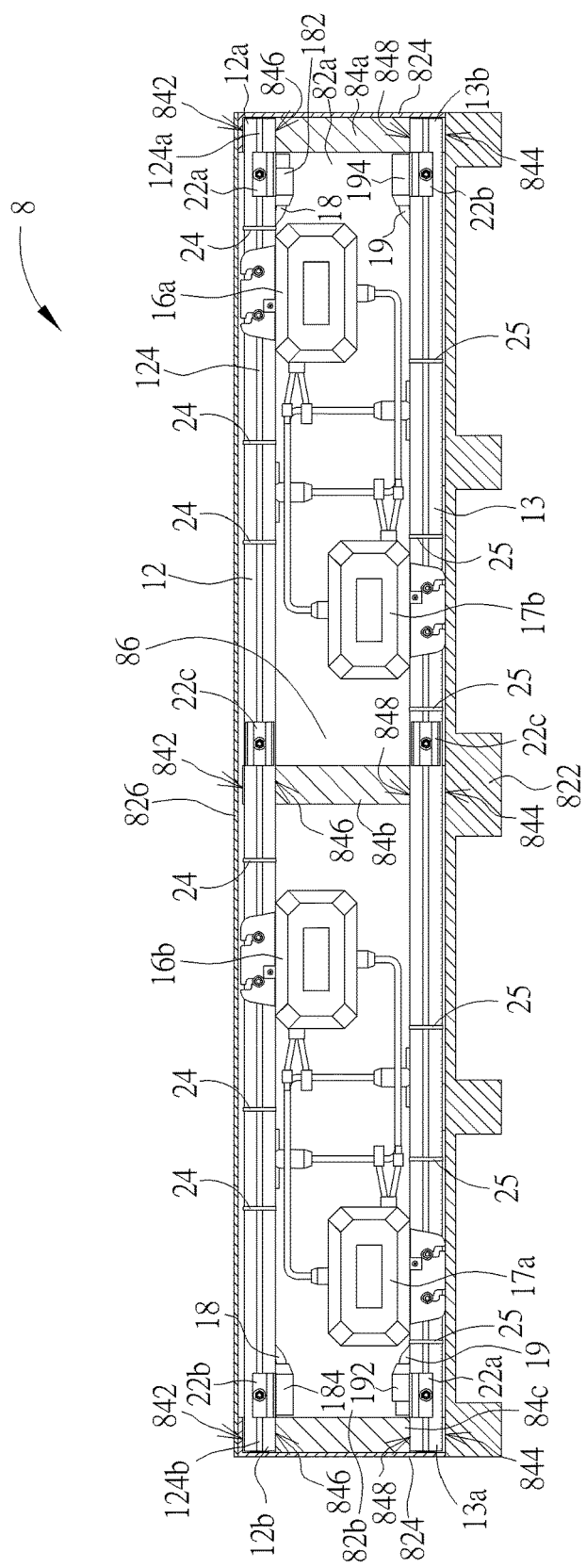
FIG. 19 is a sectional side view of the package in FIG. 17.

In logic, in the package 7, the components for forming the supporting device 5 can be regarded as being horizontally disposed in the container 7; however, the invention is not limited thereto. Please refer to FIGS. 17 to 19. FIG. 17 is a schematic diagram illustrating a package 8, which is partially-exploded, of a supporting device formed by joining more sets of the supporting device 1 than the supporting device 5 is formed. FIG. 18 is a top view of the interior of the package 8. FIG. 19 is a sectional side view of the package 8. The package 8 includes a container 82 and six sets of the components for the supporting device 5, disposed in the container 82. For a clear illustration and description convenience, there are only three sets of the components for the supporting device 5 shown in FIG. 17. Compared with the package 7, the package 8 includes more sets of the components of the supporting device 5. The components of the package 8 can be regarded as being vertically disposed in the container 82. In the following, for other descriptions of the package 8, please refer to the above relevant descriptions of the supporting devices 1 and 5, the kit 6, and the package 7 and the relevant figures, which will not be repeated in addition.

In the embodiment, the container 82 includes a base 822, two end sidewalls 824, and a cover 826, which are assembled to accommodate the components. For a clear view of the interior of the package 8 from the top view, the two end sidewalls 824 and a cover 826 are not shown in FIG. 18. The package 8 includes three spacers 84a~c disposed in parallel in the container 82. Each of the spacers 84a~c has a first side 842, a second side 844 opposite to the first side 842, six first indentations 846 at the first side 842, and six second indentations 848 opposite to the first indentation 846 at the second side 844. The quantity of the first indentations 846 and the second indentations 848 depends on how many sets of the components for the supporting device 5 are accommodated in the container 82. In the embodiment, the container 82 is filled up with the components capable of forming the supporting device equivalent to six sets of the supporting device 5; however, the invention is not limited thereto. For each set of the first frame support 12 and the second frame support 13, the first frame support 12 and the second frame support 13 are oppositely disposed in the container 82, so that the first frame support 12 is located in the three first indentations 846 of the spacers 84a~c, and the second frame support 13 is located in the three second indentations 848 of the spacers 84a~c. An accommodating space 86 is formed between the first frame support 12 and the second frame support 13.

Furthermore, the first power inverters 16a and 16b are attached to the first frame support 12 and located in the accommodating space 86. The at least one second power inverters 17a and 17b are attached to the second frame support 13 and located in the accommodating space 86. Each of the first power inverters 16a and 16b and the second power inverters 17a and 17b is disposed between adjacent two of the spacers 84a~c. In general, the power inverters 16a, 16b, 17a and 17b are usually heavier than other components, so the spacers 84a~c can equally support the weight of the first frame support 12 with the first power inverters 16a and 16b. In addition, the first frame support 12 and the second frame support 13 are disposed parallel in a direction D3, in which the first frame support 12 and the second frame support 13 extend, and which is conducive to compactly packing. The container 82 has a first container end 82a and a second container end 82b opposite to the first container end 82a in the direction D2. The first end 12a and the fourth end 13b are disposed at the first container end 82a. The second end 12b and the third end 13a are disposed at the second container end 82b. Therefore, the first power inverters 16a and 16b and the second power inverters 17a and 17b can be staggered in the accommodating space 86 in the container 82, which is conducive to compactly packing.

Furthermore, in the embodiment, the first power cable 18 and the second power cable 19 are also disposed in the container 82 together with the first frame support 12 and the second frame support 13 respectively. Therein, the first power cable 18 and the second power cable 19 are attached to the first frame support 12 and the second frame support 13 respectively, for example by ties 24 and 25. Further, in practice, the first power cable 18 and the second power cable 19 can be electrically connected to the first power inverters 16a and 16b and the second power inverters 17a and 17b respectively in advance.

Furthermore, in the embodiment, the first indentations 846 of the space 84 are formed in a structure of battlements, and the second indentations 848 are formed oppositely, so the six sets of the first frame support 12 and the second frame support 13 are disposed at regular intervals; that is, a gap exists between any two adjacent sets of the first frame supports 12 is used for accommodating the fixing members 22a~c. Each of the left fixing members 22a and the right fixing members 22b is held in the same orientation relative to the first frame supports 12 by the retainer 26, of which the details have been mentioned above and will not repeated in addition.

Furthermore, in the embodiment, the six third frame supports 14 and the six fourth frame supports 15, corresponding to the six first frame supports 12 and the six second supports 13 respectively, are stacked in the container 82, in the embodiment, at the opposite sides outside of the spacers 84a~c. In addition, it is not necessary to fix the fixing members 22a~c on the frame supports 12~15. From the top view as FIG. 18, the indentations 846 and 848 of the spacers 84a~c lead to seven gaps among the six sets of the first frame support 12 and the second frame support 13 and the two stacks of the third frame supports 14 and the fourth frame supports 15. In the embodiment, the fixing members 22a~c on the stack of the fourth frame supports 15 are disposed at the same gap where the fixing members 22a~c on adjacent one set of the first frame support 12 and the second frame support 13 are disposed. Because these fixing members 22a~c are movable, they can be moved for avoidance of interference with each other.

In addition, each set of the first frame support 12 and the second frame support 13 with the first power inverters 16a and 16b and the second power inverters 17a and 17b respectively are disposed substantially at a plane which is parallel to the direction D3 and perpendicular to the view plane of FIG. 18. From a view of opening the container 7 or the container 8, the first frame support 12 and the second frame support 13 with the first power inverters 16a and 16b and the second power inverters 17a and 17b respectively are horizontally disposed in the package 7 and vertically disposed in the package 8. Both the horizontally disposing and the vertically disposing are conducive to compactly packing, as shown by FIG. 15 and FIG. 17.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A package of a supporting device capable of supporting photovoltaic panels, the package comprising:
   a container;
   a first and a second frame support, oppositely disposed in the container, and an accommodating space being formed between the first and the second frame support;
   at least two spacers disposed in the container, each spacer having a first side, a second side opposite to the first side, a first indentation at the first side, and a second indentation opposite to the first indentation at the second side, the first frame support being located in the first indentations of the at least two spacers, the second frame support being located in the second indentations of the at least two spacers; and
   at least one first and at least one second power inverter, disposed in the accommodating space and attached to the first and the second frame support respectively between two of the at least two spacers.

2. The package of claim 1, wherein the first frame support and the second frame support are disposed parallel in a direction, the first frame support has a first end and a second end opposite to the first end in the direction, a first interval between the first end and the first power inverter closest to the first end is shorter than a second interval between the second end and the first power inverter closest to the second end, the second frame support has a third end and a fourth end opposite to the third end in the direction, a third interval between the third end and the second power inverter closest to the third end is shorter than a fourth interval between the fourth end and the second power inverter closest to the fourth end, the container has a first container end and a second container end opposite to the first container end in the direction, the first end and the fourth end are disposed at the first container end, and the second end and the third end are disposed at the second container end.

3. The package of claim 2, wherein the quantity of the at least one first power inverter is equal to or larger than two, and a sum of the first interval and the second interval is equal to an interval between any two adjacent first power inverters.

4. The package of claim 3, wherein the first interval is equal to the third interval, and the second interval is equal to the fourth interval.

5. The package of claim 1, wherein the first frame support and the second frame support are disposed parallel in a direction, in which the at least one first and the at least one second power inverter are staggered.

6. The package of claim 1, the package further comprising a power cable, attached to the first frame support and electrically connected to the at least one first power inverter.

7. The package of claim 6, wherein the first frame support has a groove, in which the power cable is disposed.

8. The package of claim 6, wherein the power cable has a terminal connector and a mating terminal connector, opposite to the terminal connector.

9. The package of claim 1, the package further comprising a fixing member, and a retainer, wherein the fixing member is moveably attached to the first frame support, and the retainer is disposed between the first frame support and the fixing member for maintaining an orientation of the fixing member.

10. The package of claim 9, wherein the fixing member comprises a pressing part and a sliding part connected to the pressing part, the first frame support has a slot, in which the sliding part is slidably disposed, and the retainer has a notch and is disposed between the first frame support and the pressing part with the sliding part fitting in the notch.

11. The package of claim 1, the package further comprising a third and a fourth frame support, stacked in the container.

12. The package of claim 11, the package further comprising a leg supporting structure, for connecting and supporting the first, the second, the third and the fourth frame support in a tilt angle, disposed in the accommodating space.

13. The package of claim 12, wherein the leg supporting structure comprises a plurality of leg supports, of which each has an angled end, for connecting and supporting the first, the second, the third and the fourth frame support in the tilt angle.

14. The package of claim 1, wherein the first and the second frame support, and the at least one first and the at least one second power inverter are disposed substantially at a plane.

15. A kit for forming a supporting device capable of supporting at least one photovoltaic panel, the kit comprising:
a first frame support;
a third frame support; and
at least one first power inverter firmly attached to a first position on the first frame support before the kit is placed at a designated installation site, wherein the first frame support has a first end and a second end opposite to the first end, a first interval between the first end and the first power inverter closest to the first end is shorter than a second interval between the second end and the first power inverter closest to the second end, and when the first frame support is under assembly at the designated installation site, the first power inverter maintains at the first position.

16. The kit of claim 15, wherein the quantity of the at least one first power inverter is equal to or larger than two, and a sum of the first interval and the second interval is equal to an interval between any two adjacent first power inverters.

17. The kit of claim 15, the kit further comprising a second frame support, a fourth frame support, and at least one second power inverter, attached to the second frame support, the second frame support and the fourth frame support being used for being disposed to adjoin and be aligned with the first frame support and the third frame support respectively in a direction wherein the second frame support has a third end and a fourth end opposite to the third end in the direction, the third end is adjacent to the second side, and a third interval between the third end and the second power inverter closest to the third end is shorter than a fourth interval between the fourth end and the second power inverter closest to the fourth end.

18. The kit of claim 17, wherein the first interval is equal to the third interval, and a sum of the first interval and the second interval is equal to an interval between any adjacent two of the at least one first and the at least one second power inverter when the first frame support and the second frame support are disposed to adjoin and be aligned with each other in the direction.

19. The kit of claim 15, the kit further comprising a first power cable, attached to the first frame support and electrically connected to the at least one first power inverter.

20. The kit of claim 19, wherein the first frame support has a groove, in which the first power cable is disposed.

21. The kit of claim 19, wherein the first power cable has a terminal connector at the first end and a mating terminal connector at the second end.

22. The kit of claim 21, the kit further comprising a second frame support, and a second power cable, attached to the second frame support, wherein the second frame support has a third end and a fourth end opposite to the third end in the direction, the second power cable has a terminal connector at the third end and a mating terminal connector at the fourth end, and when the first frame support and the second frame support are disposed to adjoin and be aligned with each other, the third end is adjacent to the second side, and the terminal connector at the third end mates with the mating terminal connector at the second end.

23. The kit of claim 15, the kit further comprising a leg supporting structure for being disposed for connecting and supporting the first and the third frame support in a tilt angle.

24. The kit of claim 23, wherein the leg supporting structure comprises a plurality of leg supports, of which each has an angled end, and the leg supporting structure uses the angled ends to connect and support the first and the third frame support in the tilt angle.

25. The kit of claim 15, the kit further comprising a middle fixing member, the first frame support having a first frame slot, the middle fixing member comprising a pressing part, and a sliding part, connected to the pressing part and slidably disposed in the first frame slot.

26. The kit of claim 25, wherein the at least one first power inverter comprises a left power inverter and a right power inverter, both the left power inverter and the right power inverter are unmovable attached to the first frame support between two ends of the first frame slot, and the middle fixing member is movable only between the left power inverter and the right power inverter.

27. The kit of claim 26, the kit further comprising a left fixing member, the first frame slot having a left slot end, to which the left power inverter is closer than the right power inverter, the left fixing member being movably connected with the first frame slot between the left slot end and the left power inverter.

28. The kit of claim 26, the kit further comprising a right fixing member, the first frame slot having a right slot end, to which the right power inverter is closer than the left power inverter, the right fixing member being movably connected with the first frame slot between the right slot end and the right power inverter.

29. The kit of claim 15, the kit further comprising a fixing member and a retainer, the first frame support having a first frame slot, the fixing member comprising a pressing part, and a sliding part, connected to the pressing part and slidably disposed in the first frame slot, the retainer being disposed between the first frame support and the fixing member for maintaining an orientation of the fixing member.

30. The kit of claim 29, wherein the retainer has a notch and is disposed between the first frame support and the pressing part with the sliding part fitting in the notch.

* * * * *